Figure 1:
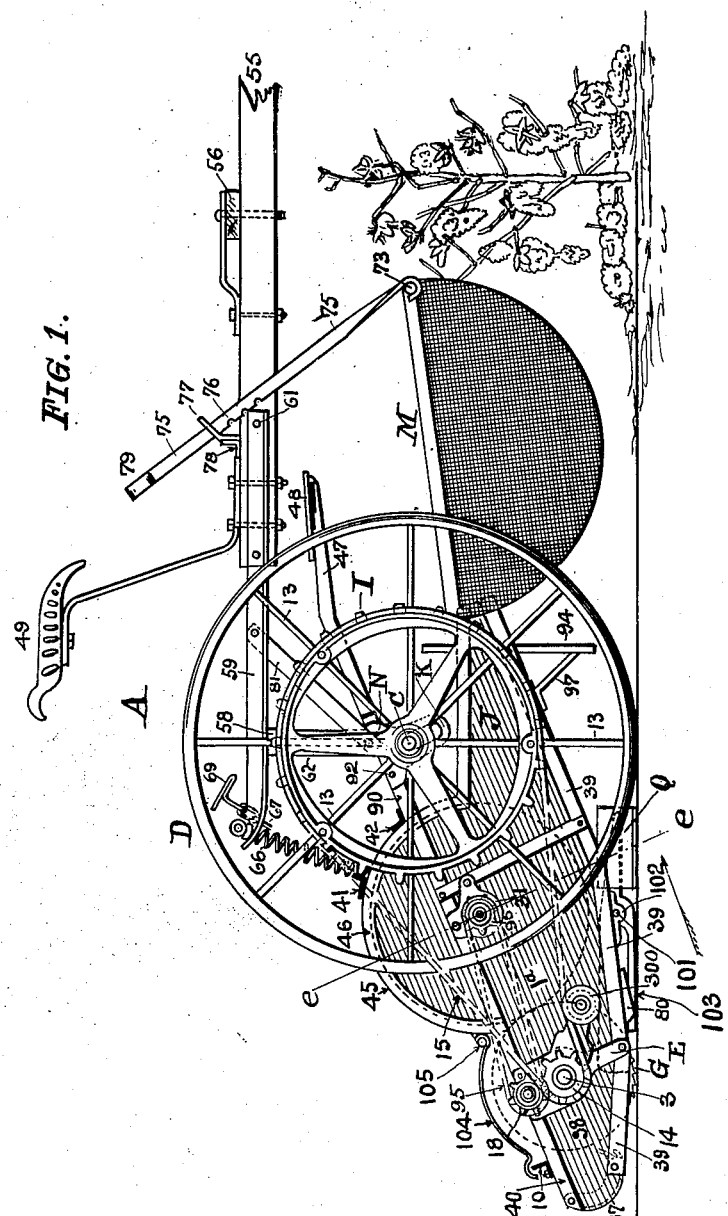

O. C. HOUGHTON.
COTTON GATHERING AND GLEANING MACHINE.
APPLICATION FILED MAR. 25, 1909.

938,864.

Patented Nov. 2, 1909.
7 SHEETS—SHEET 2.

Witnesses:
E. B. Knudsen
A. S. Peterson

Inventor:
Orley C. Houghton
By Michael J. Stark & Sons,
Attorneys.

O. C. HOUGHTON.
COTTON GATHERING AND GLEANING MACHINE.
APPLICATION FILED MAR. 25, 1909.
938,864.
Patented Nov. 2, 1909.
7 SHEETS—SHEET 3.
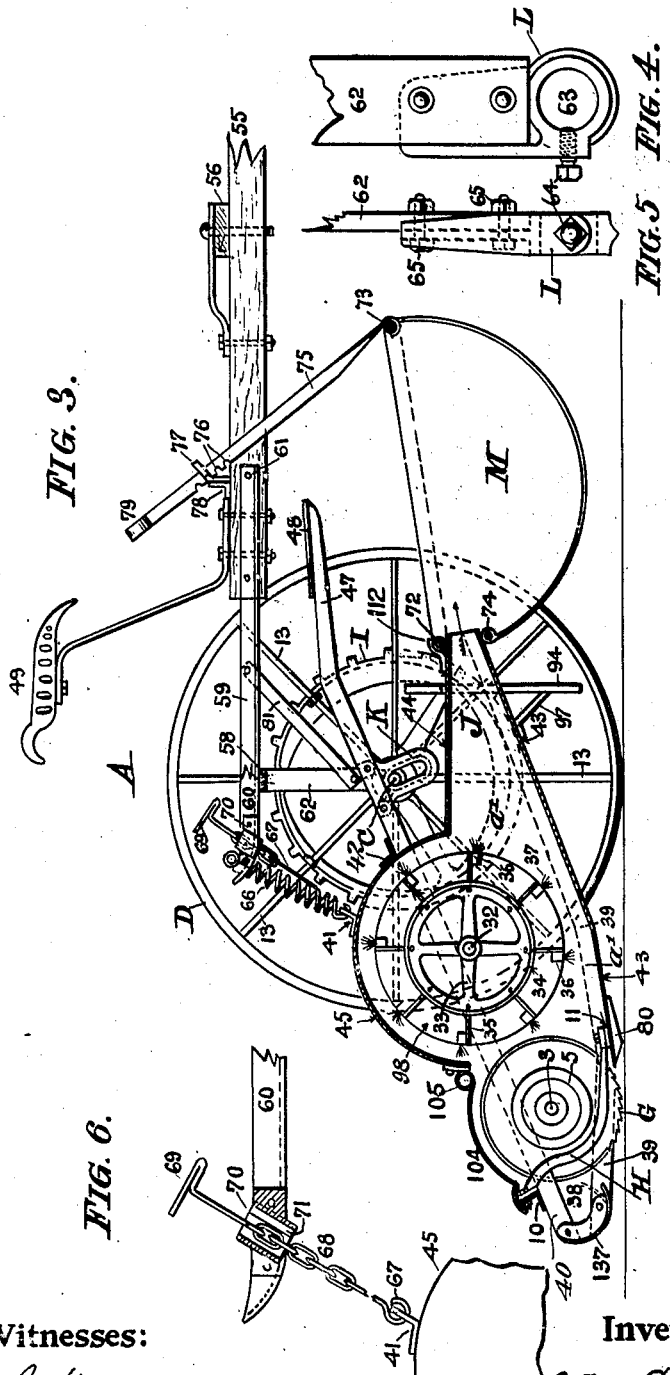
Witnesses:
C. B. Knudsen
A. S. Peterson
Inventor:
Orley C. Houghton
By Michael J. Stark & Sons
Attorneys.

O. C. HOUGHTON.
COTTON GATHERING AND GLEANING MACHINE.
APPLICATION FILED MAR. 25, 1909.
938,864.
Patented Nov. 2, 1909.
7 SHEETS—SHEET 4.
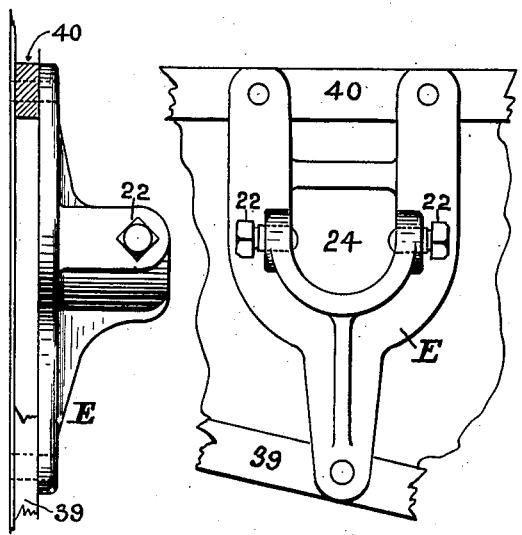
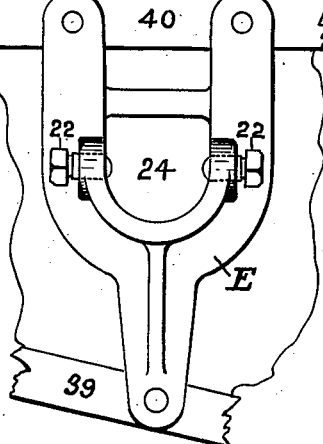
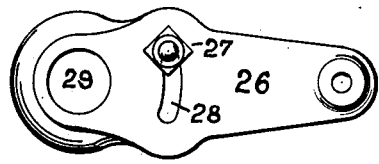
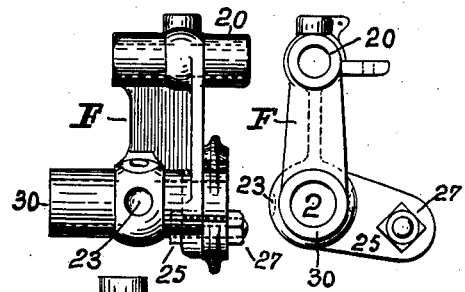
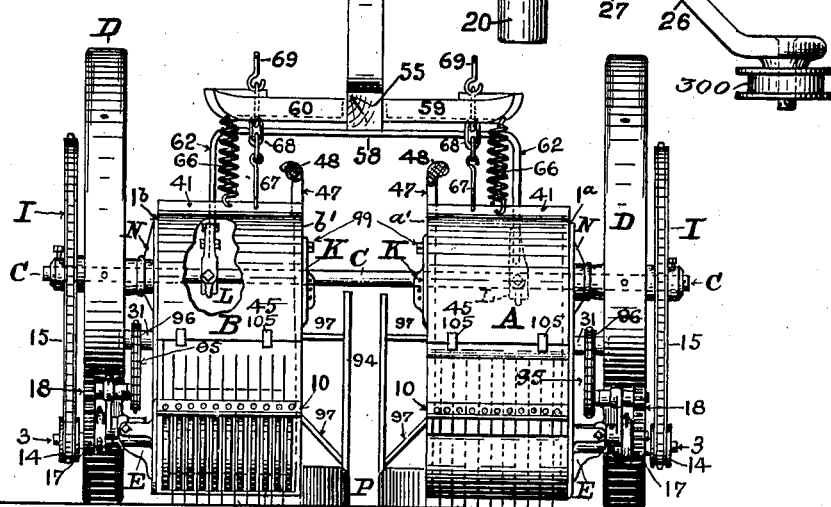
Witnesses:
C. B. Knudsen
A. B. Peterson
Inventor:
Orley C. Houghton,
By Michael J. Stark & Sons,
Attorneys.

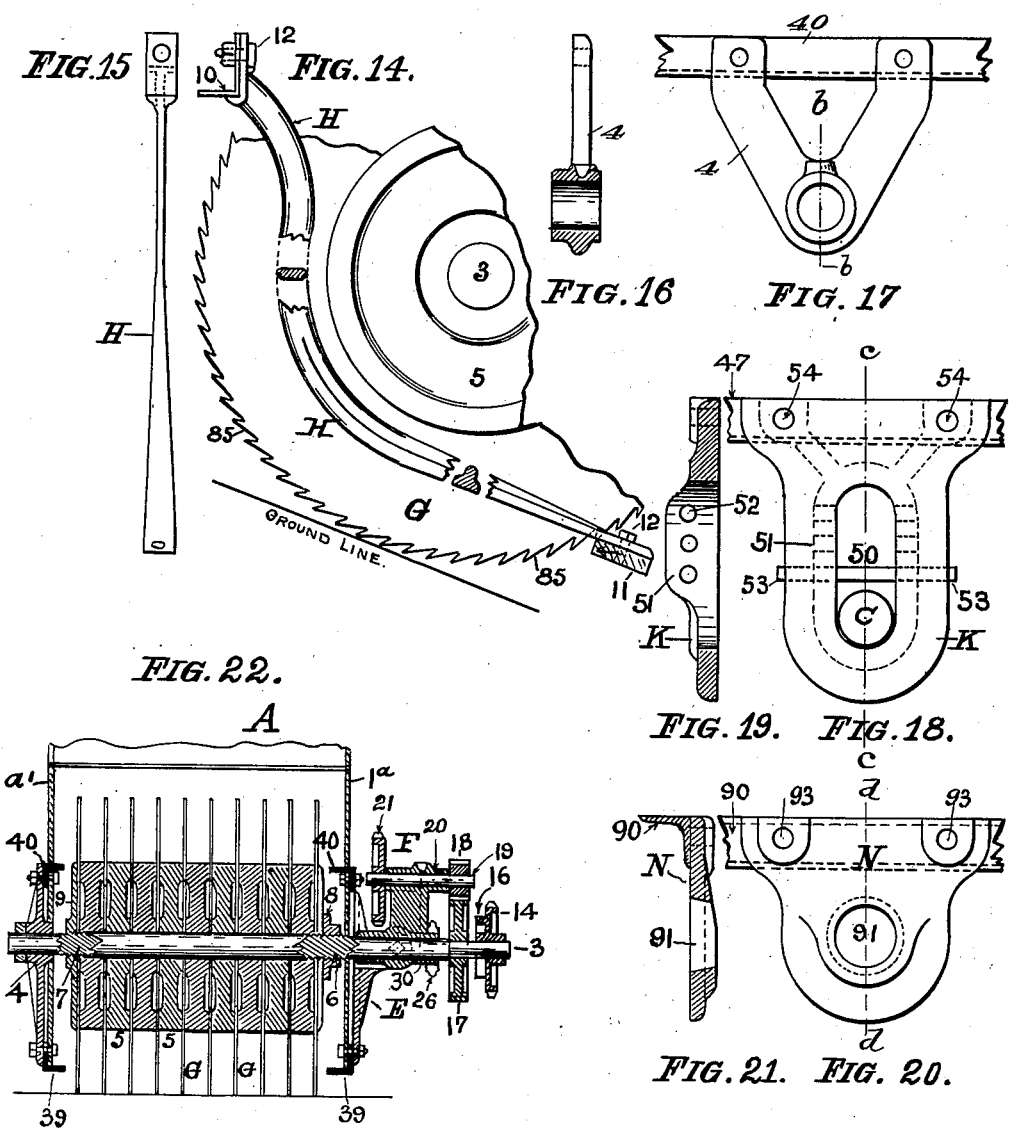

O. C. HOUGHTON.
COTTON GATHERING AND GLEANING MACHINE.
APPLICATION FILED MAR. 25, 1909.
938,864.
Patented Nov. 2, 1909.
7 SHEETS—SHEET 6.
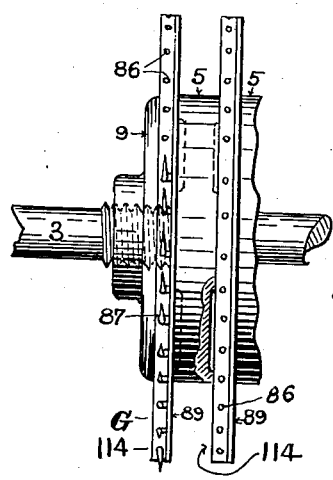
FIG. 22.ª
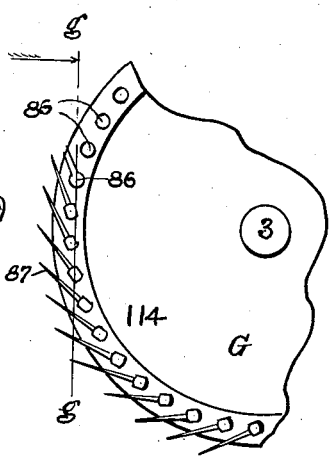
FIG. 23.
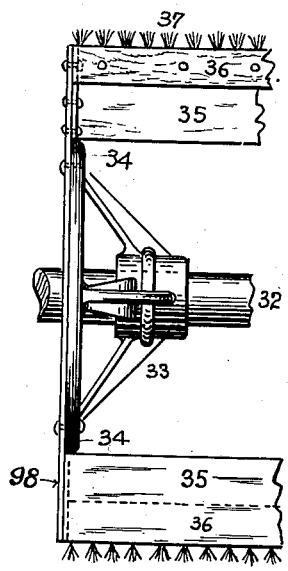
FIG. 24.
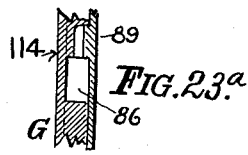
FIG. 23.ª
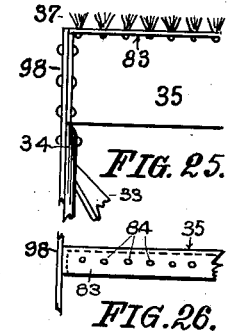
FIG. 25.
FIG. 27.
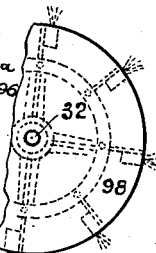
FIG. 26.
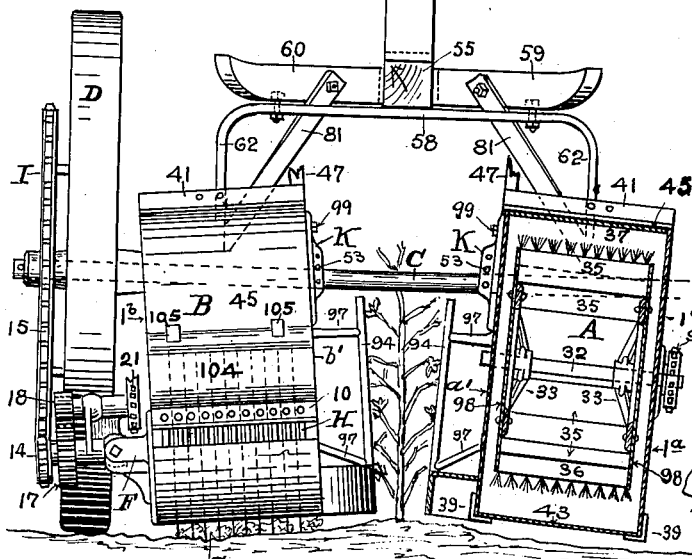
FIG. 28.
Witnesses:
E. B. Knudsen.
A. S. Peterson.
Inventor:
Orley C. Houghton,
By Michael J Stark & Sons,
Attorneys.

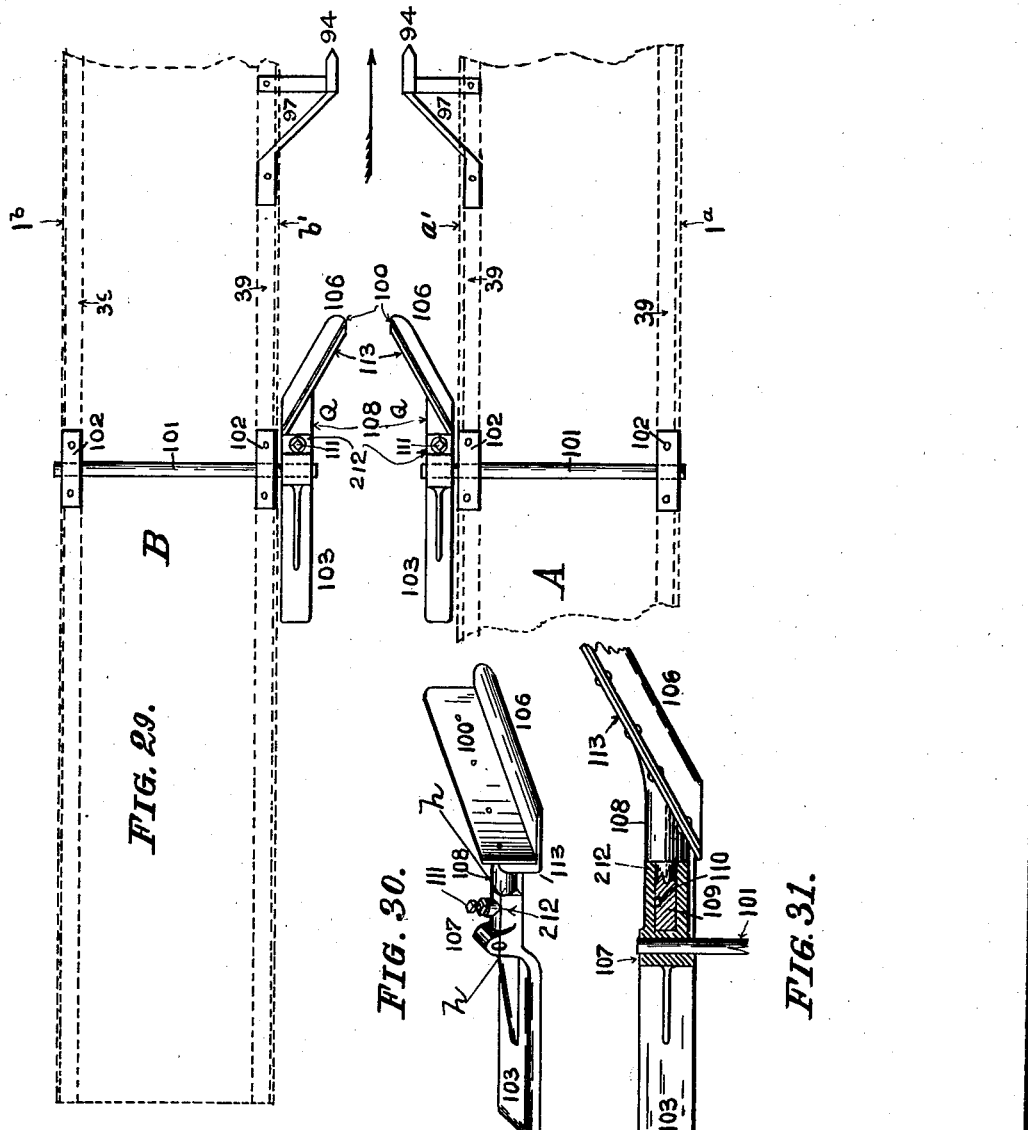

UNITED STATES PATENT OFFICE.

ORLEY C. HOUGHTON, OF CHICAGO, ILLINOIS, ASSIGNOR TO HENRY E. BULLOCK AND JAMES E. BULLOCK, BOTH OF CHICAGO, ILLINOIS.

COTTON GATHERING AND GLEANING MACHINE.

938,864.      Specification of Letters Patent.      Patented Nov. 2, 1909.

Application filed March 25, 1909. Serial No. 485,754.

*To all whom it may concern:*

Be it known that I, ORLEY C. HOUGHTON, a citizen of the United States, and resident of Chicago, Illinois, have invented certain new and useful Improvements in Cotton Gathering and Gleaning Machines; and I do hereby declare that the following description of my said invention, taken in connection with accompanying sheets of drawings, forms a full, clear, and exact specification, which will enable others skilled in the art to which it appertains to make and use the same.

This invention has general reference to cotton harvesters; and it consists, essentially, in the novel and peculiar combination of parts and details of construction as hereinafter first fully set forth and described, and then pointed out in the claims.

The object of this invention is the production of a cotton picker adapted to gather the scattered cotton which has dropped to the ground and which has heretofore been collected by manual labor, no practical cotton picking machine having thus far been produced that will pick this cotton from the ground.

It is a well-known fact that when the bolls of cotton plants open, the lint is liable to drop down upon lower branches of the plants and also upon the ground adjacent to the plants. A slight jar of the bushes, such as may be produced by an air current, or the plants entering a harvesting machine adapted to pick cotton from cotton plant portions, or other causes will invariably dislodge some of the cotton lint and cause it to drop to the ground, and since the few cotton picking machines now available for successfully picking cotton, are all designed to pick cotton from the plants only, and are incapable of picking cotton from the ground, this lint has heretofore been gathered by laborers, which makes the gathering very expensive and often impossible owing to the scarcity of cheap labor in the cotton producing States.

My machine is, therefore, designed to follow the cotton harvesters heretofore mentioned and to pick up such cotton as has not been gathered by these machines and to clean such cotton from foreign matter such as portions of branches, limbs, bolls &c., and to deposit this cotton in suitable receptacles carried on the machine.

Generally speaking this machine comprises one or more pivoted machine bodies having an axle and traction wheels in common, each of said machine bodies being provided with its own cotton picking mechanism, cleaning mechanism and means for transmitting the picked cotton to receptacles adapted to receive the same. These machine bodies are so constructed as to be adapted to follow the undulations of the ground over which the machine is being moved independently of each other and independently of the vertical movement of the same caused by the traction wheels when moving over undulated ground, and they are provided with means adapted to prevent the cotton picking means proper from entering the ground, these means serving at the same time as compressors to force the loose cotton upon the ground and to hold limbs and branches of the plants upon the ground while the picking means proper are removing the cotton therefrom.

The picking mechanism proper comprises, preferably, a series of rotating disks spaced a suitable distance apart and having means on their periphery to pick the cotton, revolving brushes being provided to remove the picked cotton from the picking means proper, and an air-current producing apparatus, such as a rotary fan blower, to transmit the cotton to the receptacles adapted to receive the same. There is also provision made for dislodging cotton from the plants, and scraping means for pushing the cotton on the ground in the path of the picking mechanism to enable the latter to pick that cotton which is not directly in the path of the picking means. Another feature of this machine is the introduction of means in the duct through which the cotton is conveyed to the baskets; of means for separating sand, grit, and other fine matter, from the cotton, and also means for separating the cotton from the trash, such as limbs and branches, &c., and to collect the same in a receptacle adapted to receive the same, so that only clean cotton is delivered to the baskets.

In order to accomplish these objects I construct this machine as shown in the drawings already mentioned, and in which—

Figure 2:
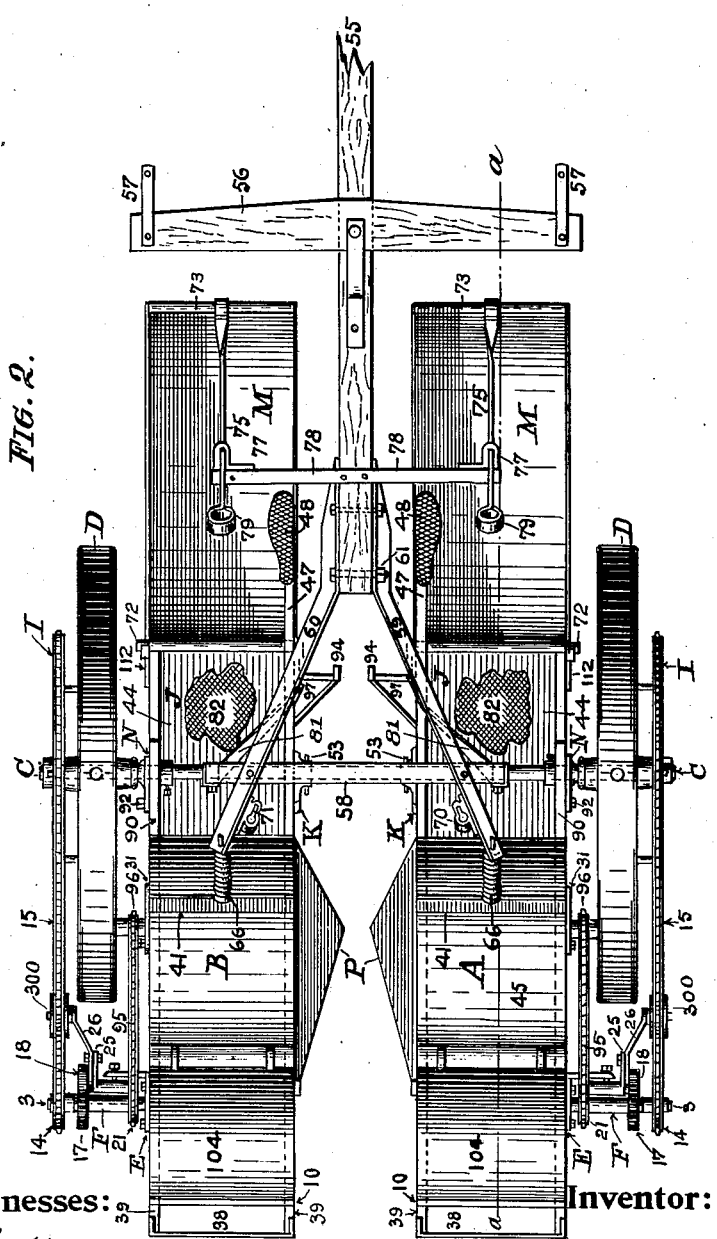

Figure 1 is a side elevation of my improved cotton picking machine. Fig. 2 is a plan of the same. Fig. 3 is a longitudinal sectional elevation on line *a a* of Fig. 1

2. Fig. 4 is a front elevation of the lower end of the axle-hanger that connects the pole of the running gear with the axle thereof. Fig. 5 is a side elevation of the same. Fig. 6 is a sectional view of a fragment of the machine illustrating the means for retaining the machine bodies in an elevated position. Fig. 7 is a rear elevation of the machine, the cover for the picking mechanism of one of the machine bodies being removed and minor details of construction being omitted. Fig. 8 is a side elevation of one of the cylinder bearing brackets, and Fig. 9 is an end elevation of the same. Fig. 10 is a side elevation of the arm carrying the main-chain tightening roller or sheave. Fig. 11 is a side elevation of the bearings for one end of the cylinder shafts and for the driven gear wheel by which the fan shaft is rotated. Fig. 12 is an end elevation of the same. Fig. 13 is a plan of this bearing, the arm and the chain-tightener assembled. Fig. 14 is an elevation of a fragment of the cotton picking means and the grate. Fig. 15 is an end elevation of one of the grate bars detached. Fig. 16 is a sectional elevation on line b b of Fig. 17, and Fig. 17 is a plan of the inner bearing for the cylinder shaft. Fig. 18 is a plan of the inner bearings for the main axle. Fig. 19 is a sectional elevation of the same on line c c of Fig. 18. Fig. 20 is a plan of outer bearings of the main axle, and Fig. 21 a sectional elevation of the same on line d d of Fig. 20. Fig. 22 is a sectional elevation of the cylinder so-called, it being the picking mechanism complete. Fig. 22ª is an elevation of a portion of the cylinder. Fig. 23 is a plan of a portion of one of the picking disks. Fig. 23ª is a sectional view of a fragment of the said disk on line g g of Fig. 23. Fig. 24 is an elevation of a portion of the fan and brush mechanism. Fig. 25 is a fragmental plan of a modification of the device shown in Fig. 24. Fig. 26 is a plan of a part of the fan-plate illustrated in Fig. 25. Fig. 27 is a rear elevation of the machine showing the machine bodies tilted or inclined from their vertical plane, and Fig. 28 is a plan of a part of the fan wheel detached. Fig. 29 is a diagrammatic plan of the machine bodies and illustrating details of construction and the location of the strippers and the scrapers. Fig. 30 is a perspective view of one of the scrapers detached. Fig. 31 is a plan, in part in section, of the scraper on line h h of Fig. 30.

Like parts are designated by corresponding characters and symbols of reference in all the various figures.

A in the drawings designates the right hand, and B the left hand machine body as seen from the rear end thereof and looking forward. These two machine bodies are journaled or pivoted upon a single axle, heretofore designated the main axle C, said axle having at each end a traction wheel D, there being but two of these traction wheels on the machine. On the outermost sides 1ª and 1ᵇ of these machine bodies and near the rear ends thereof, there are cylinder bearing brackets E, shown in detail in Figs. 8 and 9, wherein are pivoted shaft bearings F, illustrated in detail in Figs. 11, 12, and 13, there being in this member a bearing 2, Fig. 12, for the reception of the cylinder shaft 3. In this connection I will here state that the construction of these machine bodies with all their containing parts and appurtenants is alike except where otherwise stated, that is to say, the parts are the same except that they are rights and lefts, and I shall, therefore, describe these parts in the singular number.

The cylinder shaft 3 has on one end a journal 4, and upon this shaft 3 there are located a series of circular disks G, spaced a suitable distance apart by annular separating disks 5, said shaft 3 being screw-threaded at 6 and 7 respectively, to receive clamping disks or nuts 8 and 9, by which the disks and separators are removably secured to the shaft 3.

H designates a grate consisting of a series of curved bars shown in detail in Figs. 14 and 15. These bars are placed between the disks G and also on the outside of the end-disks, and they are removably attached with their upper ends to an angle-bar 10, and with their lower ends to a cross bar 11, by means of screws or bolts 12. This grate forms a partition or wall between that portion of the machine body containing the picking mechanism and a receptacle 38, located at the rear end of the machine body and into which portions of the disks G enter, and to which I shall hereinafter more particularly refer.

To the spokes 13, and on the outer side of the traction wheel D there is securely fastened a main sprocket wheel I, and upon the outer end of the cylinder shaft 3 there is located a driven sprocket wheel 14, a drive chain 15, connecting these two sprocket wheels in the usual manner. Near the outer end of the shaft 3 and adjacent to the driven sprocket wheel 14 there is a spur gear wheel 17, meshing with a gear pinion 18, secured to the outer end of a short shaft 19, which revolves in a bearing 20, formed on the cylinder shaft bearing F, the inner end of said shaft 19 carrying a driver sprocket wheel 21, for the object hereafter to be referred to. This cylinder shaft bearing is pivoted in the bracket E upon set-screws 22, Fig. 8, engaging cup-shaped depressions 23 in said bearing F, the outer diameter of the bearing F where it is engaged by said set screws being smaller than the opening 24 in the bracket E to permit of lateral movement of the bearing F in the bracket E to enable slack in a drive chain 95, hereinafter to be referred to, being taken up when required. On the bearing arm F there is an auxiliary arm 25, to which is movably secured an arm 26, by a bolt 27 passing through a slotted aperture 28, Fig. 10, said arm 26 having also an annular bore 29, engaging a correspondingly shaped extension 30, on said bearing arm F, and serving as a pivot for the auxiliary arm 26. To the outer end of the arm 26 there is pivoted or journaled a sheave 300, which sheave is in line with the main drive chain 15, and serves as a tightener for this chain in a manner easily understood.

To the outer walls of the machine bodies A and B, and a suitable distance from the cylinder bearing bracket E there is secured a further bearing 31, for the reception of a fan-shaft 32, Figs. 3 and 24, upon which is mounted a rotary fan consisting of two spiders 33 having rims 34, to which are secured annular disks 98, said disks being connected by a series of fan-plates 35. To the outer longitudinal edges of these plates there are secured, preferably wooden, bars 36, having a series of brushes 37, which brushes reach the outer periphery of the disks G and are adapted to remove from said disks the cotton lint that has been picked by the picking mechanism.

The rear end of the machine bodies is curved at 137 to provide the receptacle 38 already mentioned in which the trash that has been intercepted by the grate may collect and from which this trash may be readily removed.

As already stated there are in the machine bodies outer walls 1ª and 1ᵇ, and there are also inner walls $a^1$ and $b^1$, respectively. The walls in each machine body are secured to longitudinal bottom angle bars 39 and longitudinal top angle bars 40, the latter being connected transversely by the angle bars 10, and 42, while the longitudinal angle bars 39 are connected by the cross-bar 11. Then there is securely fastened to the longitudinal bottom angle bars a bottom plate 43, and to the longitudinal top angle bars 40 a top plate 44, and a curved top plate 45 secured to curved bars 46, thereby producing a very strong hollow machine body well designed to receive the mechanisms described, said body terminating in a gradually contracted duct J, as clearly illustrated in Figs. 1 and 3.

The upper, inner longitudinal angle bars 40 have extensions 47, to the forward end of which are fastened foot-plates 48, by means of which the machine bodies may be independently lifted at their rear ends by the operator mounted upon the seat 49 standing upon either or both of the foot-plates 48, as the case may be. To these extensions 47 there is secured a hanger K, illustrated in detail in Figs. 18 and 19, there being in said hanger a slotted aperture 50, for the passage of the main axle C, said hanger having cheeks 51, provided with transverse holes 52, through which a pin 53, Figs. 2 and 18, may be passed. By lifting the machine bodies A and B on their inner opposing sides, these machine bodies may be inclined from their vertical position and retained in this inclined position by passing the pins 53 over the axle C, as shown in Fig. 27, so that, as is usually the case in cultivating cotton, the ground adjacent to the cotton plants may be hilled, and the picking mechanism at the rear end of the machine body be substantially parallel with the ground. These hangers K are secured to the extensions 47 by bolts 99, passing through bolt-holes 54 in said brackets and in the extensions.

The outer longitudinal top bars 40 are provided with extensions 90, similar to the extensions 47, except that they are shorter, and they are fitted with bearings N, illustrated in detail in Figs. 20 and 21, there being a tapering bore 91, in said bearings for the passage of the axle C, which bearing forms, as it were, the pivotal point for the machine body, in conjunction with the bearing bracket K, said bearing 91 being bored tapering so as to enable the axle C to assume the inclined position when the body is tilted. The brackets N are secured to the extensions 90 by bolts 92 passing through bolt-holes 93 in said bearings and the extensions 90.

This cotton picking machine is to be propelled by a team of animals hitched to a pole 55 by a double tree 56, and a pair of swingle trees bolted to yokes 57, Fig. 2, on the ends of the swingle tree. This pole connects with the main axle C by a cross bar 58, securely fastened to two rearwardly and outwardly extending angle bars 59 and 60, bolted to the pole 55 by bolts 61. This bar 58 is downwardly bent to afford two parallel members 62, carrying at their lower ends axle-bearings L, shown in detail in Figs. 4 and 5, said bearings L having openings 63, for the passage of the axle C, and set-screws 64, to fasten the same to the axle C, the bearings L being fastened to the ends of the members 62 by screws or bolts 65.

In order to approximately balance the machine bodies upon the pivotal points thereof, but still leave the preponderance of weight at the rear end, this end being of necessity the heavier owing to the machinery contained therein, there are attached near the rear ends of the angle bars 59 and 60, spiral springs 66 connecting the angle bars 59 and 60 with the cross bars 41; and in order to retain the machine bodies in an elevated position at their rear ends, when desired, as for instance, in moving to and from the field, in turning in the field &c., there are secured to the cross angle bars 41, rods 67, having near their upper ends a number of chain links 68, and terminating in handles 69. These chain links, as shown in detail in Fig. 6, pass through sockets 70 secured to the angle-bars 59 and 60 respectively, said sockets 70 having a circular passage for the chain links and a narrow slot 71 wide enough only to readily pass a chain link endwise, so that in order to lift the rear end of a machine body the operator pulls the respective handle 69 until the desired elevation of the rear end of the machine body is sustained, and then slides the proper chain link 68 into the narrow slot 71 when the next succeeding chain link above the socket, being crosswise of the slot 71, will hold the machine body in the elevated position.

To support the rear ends of the machine bodies upon the ground when picking cotton, and at the same time to prevent the picking disks from entering the ground, there are placed near the rear end of each machine body, and on the under side thereof, and in advance of the picking mechanism, but in close proximity thereof, shoes 80, as shown in Figs. 1 and 3. These shoes, while being moved over the cotton field, will press down upon the ground all cotton within their reach so that the picking mechanism may pick the same; they will also hold to the ground any limbs or branches of cotton plants that may be within their reach while the picking mechanism is removing the lint therefrom.

I have heretofore stated that the disks G are adapted to pick cotton, and I shall now describe the means that are employed for this purpose. These disks have their periphery serrated or provided with teeth similar to saw-teeth 85, as shown in Figs. 1, 3 and 14, but they may also and preferably be constructed as shown in Figs. 22ª, 23, and 23ª, in two parts in the process of casting, the main body 114 being a plain circular disk having in one face a sufficient number of recesses 86 to receive removable teeth 87. These teeth may be, and I shall prefer to use, nails, which are very cheap and can be renewed at a trifling cost, but I may also use wire or bristle brushes should such use be found desirable or necessary. When employing disks having inserted teeth, I shall place a cover plate 89, over the recessed face of the disk 114 to retain the inserted teeth in position.

On the outer end of the fan shaft 32 there is securely affixed a driven sprocket wheel 96, connected with the driving sprocket wheel 21 on the inner end of the short shaft 19 by a drive chain 95. The proportion of this gearing is such that the cylinder shaft 3 will revolve as much faster than the main driving sprocket wheel J, as is necessary to give to the picking disks G a peripheral speed slightly in excess of the forward movement of the machine, while the gearing 17 and 18, and the chain drive to the fan shaft will give to the latter sufficient speed to produce the required air-current in the duct J to carry the cotton to baskets M, located at the forward part of the machine bodies. These baskets M, I prefer to make of canvas, and in substantially semi-circular form. On the upper ends of these baskets I provide rods 72 and 73, to which latter rods one end of the canvas is attached, and below the rods 72 I provide further rods 74, to which the other end of the canvas is secured, the distance between the rods 72 and 74 being approximately equal to the height of the duct J near its forward end, and the width of the baskets approximately equal to the width of said duct, so that the baskets M will be carried upon the ends of the ducts with one end, the opposite end being carried by rods 75, as clearly shown in the drawings. These rods 75 are hooked to the rods 73 with one end and they have near their opposite end notches 76, adapted to engage brackets 77, secured to a transverse angle bar 78, fastened to the pole 55 in any suitable manner. The upper ends of these rods 75 terminate in handles 79, located within convenient reach of the operator when seated upon the seat 49. This mechanism is designed to enable the baskets M being lifted at their forward ends whenever necessary to pass over obstructions or for other obvious reasons. The tendency of the rods 75 is to draw the baskets M rearwardly on the ducts J, and in order to prevent their being wedged upon the tapering ends of the ducts, there are located upon, or on the side of, the top plate 44, stops 112, Figs. 2 and 3, which stops engage the rod 72 in such manner that the basket M may be readily withdrawn therefrom when required, as in the case of the basket being filled with cotton and it is desired to remove the same, and for other obvious purposes.

In order to stiffen the construction of the running gear of this machine there are provided brace rods 81, Figs. 1, 2, and 3, that connect the angle bars 59 and 60 with the parallel members 62 of the cross bar 58; and in order to provide for the escape of any dust, sand, and other foreign matter that may be passing through the duct J, there is in the bottom plate of each machine body a suitable opening covered with a fine wire-screen or cloth 82, as illustrated in Fig. 2.

I have heretofore described the fan wheel as being provided with transverse bars 36 to which the brushes 37 are affixed. This construction may, however, be modified by bending the fan plates 35 at right angles at their outer longitudinal edges to provide a member 83, Figs. 25 and 26, which member is perforated at 84 to receive the brushes 37 in any convenient manner.

It is well known that the bolls of cotton plants do not all open at the same time or approximately at the same time, in fact some of these bolls may not open within a month or longer after the first ones have broken open, and in Fig. 1, I have shown a cotton plant which is a substantial reproduction of a photograph of a cotton plant and which illustrates the average condition of these plants at the harvest time, and shows that a considerable portion of the lint has dropped upon the ground, while other portions are still adhering to the open bolls or to limbs and branches of the cotton plant, and in order to dislodge this cotton from the plants, I locate in the space between the machine bodies, and sufficiently in advance of the picking mechanism, a stripper consisting, preferably, of two approximately vertical bars 94. These bars are attached to the machine bodies by brace-rods 97, and they are spaced sufficiently close to strip any loose cotton from the plants while passing the same, and cause it to drop to the ground; and in order to push this cotton on the ground in the path of the picking mechanism, I locate in the space between the machine bodies, and in the rear of the stripper but in advance of the picking mechanism, scrapers Q, shown in detail in Figs. 29, 30, and 31, said scrapers comprising blades 100, secured to angle bars 113, pivoted to bodies 103 each of which has a boss 107, said boss 107 being adapted to receive a shaft 101, oscillating in bearings 102 secured to the under side of the lower longitudinal angle bars 39. The angle bar 113 has a rearwardly extending boss 108, terminating in a cylindrical shank 109, adapted to oscillate in a correspondingly bored boss 212, formed on the body 103, there being a groove 110, in the shank 109, and a set-screw 111, in the boss 212 to hold the scraper proper movably to the boss 212, said groove 110 being also adapted to limit the oscillatory movement of the scraper proper, by not extending around the entire periphery of the shank 109. The forward member 106 of the angle bar 113 moves close to the ground and prevents the scraper from entering the same, and it being pivoted to the body 103 and the latter free to oscillate on its shaft 101 this scraper is adapted to follow the undulations of the ground independently of the movement of the machine body, whether the latter is in a vertical or an inclined position. There being two of these scrapers in the space between the machine bodies and inclining rearwardly, these scrapers push the cotton on the ground and within their reach outwardly in the path of the picking mechanism to enable the latter to pick the same, as already stated. The rear portion 103 of the scraper body serves as a counterweight to approximately balance the scraper upon the pivoting shaft 101, a slight preponderance of weight being in the scrapers proper to cause them to lie close to the ground but not enough so as to cause them to enter the ground.

I will here state that the running gear of this machine comprises that portion thereof by which the machine bodies are moved and from which they are suspended, said running gear comprising the pole 55, the two rearwardly and outwardly projecting bars 59 and 60, the transverse bar 58 with its downwardly projecting parallel members 62, the brace rods 81, the main axle C, and the two traction wheels D. This running gear I have designed as being the simplest, yet very strong and substantial means for carrying the machine bodies, but other and different running gears may be employed or a four-wheeled truck may be substituted without departing from the scope of my invention, and where I claim in the adjoining claims "a running gear" I desire it to be understood that any suitable running gear is referred to.

In claiming a machine body or machine bodies adapted to follow the undulations of the ground over which the machine is being moved, I desire it understood that such a machine body is so pivoted that that portion thereof which contains the picking mechanism is free to follow the undulations of the ground independently of the vertical movement of the machine body due to undulations of the ground over which the traction wheels pass in moving over the field. I also desire it to be understood that I am well aware that a single machine body with its cotton picking mechanism and its other appurtenants may be employed to pick cotton from the ground instead of two machine bodies without departing from my invention, and that many changes in the details of construction of the various parts described may be resorted to without departing from the scope of my invention.

In order to lift lower branches of the cotton plants to prevent them from coming in contact with the picking mechanism, I locate in the space between the machine bodies lifters P, which are tapering, preferably sheet metal bodies secured to the inner opposing walls of the machine bodies slightly in advance of the picking mechanism.

In order that ready access may be had to the picking mechanism, the curved plate 104 over the same and serving as a cover, is hinged to the curved plate 45 by hinges 105, and rests with its free end on the transverse angle bar 10, as clearly illustrated in Figs. 1 and 3.

Having thus fully described this inven- tion, I claim as new and desire to secure to me by Letters Patent of the United States—

1. A cotton picking machine including a running gear, there being a main axle in said running gear, two machine bodies, said machine bodies being placed a sufficient distance apart to permit cotton plants to pass bodily between them the passage thus formed being unobstructed, each of said machine bodies being pivoted to said main axle independently of the other and free to follow the undulations of the ground over which the machine is being moved, and cotton picking mechanism in each of the two machine bodies and adapted to pick cotton from the ground adjacent to the cotton plants.

2. A cotton picking machine including a running gear, there being a main axle in said runnig gear, two machine bodies, said machine bodies being placed a sufficient distance apart to permit cotton plants to pass bodily between them the passage thus formed being unobstructed, each of said machine bodies being pivoted to said main axle independently of the other and free to follow the undulations of the ground over which the machine is being moved; means for preventing the free ends of said machine bodies from entering the ground; and cotton picking mechanism within each of said machine bodies and adapted to pick cotton from the ground adjacent to the cotton plants.

3. A cotton picking machine including a running gear, there being a main axle in said running gear, two machine bodies, said machine bodies being placed a sufficient distance apart to permit cotton plants to pass bodily between them the passage thus formed being unobstructed, each of said machine bodies being pivoted to said main axle independently of the other and free to follow the undulations of the ground over which the machine is being moved; means for preventing the free ends of said machine bodies from entering the ground, said means being located at the rear ends of said machine bodies, and cotton picking mechanism within each of said machine bodies and adapted to pick cotton from the ground adjacent to the cotton plants.

4. A cotton picking machine including a running gear, there being a main axle in said running gear, two machine bodies, said machine bodies being placed a sufficient distance apart to permit cotton plants to pass between them the passage thus formed being unobstructed, each of said machine bodies being pivoted to said main axle independently of the other and free at its rear end to follow the undulations of the ground over which the machine is being moved, and cotton picking mechanism in each of the two machine bodies and adapted to pick cotton from the ground adjacent to the cotton plants.

5. A cotton picking machine including a running gear, there being a main axle in said running gear, two machine bodies, said machine bodies being placed a sufficient distance apart to permit cotton plants to pass bodily between them the passage thus formed being unobstructed, each of said machine bodies being pivoted to said main axle independently of the other and free at its rear end to follow the undulations of the ground over which the machine is being moved, means for preventing the free ends of said machine bodies from entering the ground, and cotton picking mechanism in each of said machine bodies and adapted to pick cotton from the ground adjacent to the cotton plants.

6. A cotton picking machine including a running gear, there being a main axle in said running gear, two machine bodies, said machine bodies being placed a sufficient distance apart to permit cotton plants to pass bodily between them the passage thus formed being unobstructed, each of said machine bodies being pivoted to said main axle independently of the other and free at its rear end to follow the undulations of the ground over which the machine is being moved; means for preventing the free ends of said machine bodies from entering the ground, and cotton picking mechanism in each of the said two machine bodies and adapted to pick cotton from the ground, said means being located at the rear end of each of said machine bodies.

7. A cotton picking machine including a running gear, there being a main axle in said running gear, two machine bodies, said machine bodies being placed a sufficient distance apart to permit cotton plants to pass bodily between them the passage thus formed being unobstructed, each of said machine bodies being pivoted to said main axle independently of the other and free to follow the undulations of the ground over which the machine is being moved, and cotton picking mechanism in each of said machine bodies, said picking mechanisms being located at the rear end of said machine bodies and adapted to pick cotton from the ground adjacent to the cotton plants.

8. A cotton picking machine including a running gear, there being a main axle in said running gear, two machine bodies, said machine bodies being placed a sufficient distance apart to permit cotton plants to pass bodily between them the passage thus formed being unobstructed, each of said machine bodies being pivoted to said main axle independently of the other and free to follow the undulations of the ground over which the machine is being moved; cotton picking mechanism in each of said machine bodies, said picking mechanism being located at the rear end of each of said machine bodies and adapted to pick cotton from the ground adjacent to the cotton plants, and means for preventing the free ends of said machine bodies from entering the ground.

9. A cotton picking machine including a running gear, there being a main axle in said running gear, two machine bodies, said machine bodies being placed a sufficient distance apart to permit cotton plants to pass bodily between them the passage thus formed being unobstructed; each of said machine bodies being pivoted to said main axle independently of the other and free to follow the undulations of the ground over which the machine is being moved, cotton picking mechanism in each of said machine bodies and adapted to pick cotton from the ground adjacent to the cotton plants, and means for preventing the free ends of said machine bodies from entering the ground, said latter means and the cotton picking mechanisms being located at the rear end of said machine bodies.

10. A cotton picking machine including a running gear, there being a main axle in said running gear, two machine bodies, said machine bodies being spaced a sufficient distance apart to permit cotton plants to pass bodily between them the passage thus formed being unobstructed, each of said machine bodies being pivoted to said main axle independently of the other and free at its rear end to follow the undulations of the ground over which the machine is being moved, and cotton picking mechanism in each of said machine bodies and adapted to pick cotton from the ground adjacent to the cotton plants.

11. A cotton picking machine including a running gear, there being a main axle in said running gear, two machine bodies, said machine bodies being spaced a sufficient distance apart to permit cotton plants to pass bodily between them the passage thus formed being unobstructed, each of said machine bodies being pivoted to said main axle independently of the other and free at its rear end to follow the undulations of the ground over which the machine is being moved; means for preventing the free ends of said machine bodies from entering the ground, and cotton picking mechanism adapted to pick cotton from the ground adjacent to the cotton plants.

12. A cotton picking machine including a running gear, there being a main axle in said running gear, two machine bodies, said machine bodies being spaced a sufficient distance apart to permit cotton plants to pass bodily between them the passage thus formed being unobstructed, each of said machine bodies being pivoted to said main axle independently of the other and free at its rear end to follow the undulations of the ground over which the machine is being moved; means for preventing the free ends of said machine bodies from entering the ground, said means being located at the rear end of each of said machine bodies, and cotton picking mechanism adapted to pick cotton from the ground adjacent to the cotton plants.

13. A cotton picking machine including a running gear, there being a main axle in said running gear, two machine bodies, said machine bodies being spaced a sufficient distance apart to permit cotton plants to pass bodily between them the passage thus formed being unobstructed, each of said machine bodies being pivoted to said main axle independently of the other and free at its rear end to follow the undulations of the ground over which the machine is being moved and cotton picking mechanism in each of said machine bodies and adapted to pick cotton from the ground adjacent to the cotton plants, said picking mechanism being located at the rear end of each of said machine bodies.

14. A cotton picking machine including a running gear, there being a main axle in said running gear, two machine bodies, said machine bodies being spaced a sufficient distance apart to permit cotton plants to pass bodily between them the passage thus formed being unobstructed, each of said machine bodies being pivoted to said main axle independently of the other and free at its rear end to follow the undulations of the ground over which the machine is being moved; means to prevent the free ends of said machine bodies from entering the ground, and picking mechanism adapted to pick cotton from the ground adjacent to the cotton plants, said cotton picking mechanism being located at the rear end of each of said machine bodies.

15. A cotton picking machine comprising a running gear, there being a main axle in said running gear, two machine bodies, said machine bodies being spaced a sufficient distance apart to permit cotton plants to pass bodily between them the passage thus formed being unobstructed, each of said machine bodies being pivoted to said main axle independently of the other and free at its rear end to follow the undulations of the ground over which the machine is being moved means to prevent the free ends of said machine bodies from entering the ground, and cotton picking mechanism adapted to pick cotton from the ground adjacent to the cotton plants, said means and the cotton picking mechanism being located at the rear end of each of said machine bodies.

16. A cotton picking machine including a running gear, there being a main axle in said running gear, two machine bodies, said machine bodies being placed a sufficient distance apart to permit cotton plants to pass bodily between them, the passage thus formed being unobstructed, each of said machine bodies being pivoted to said main axle independently of the other and free to follow the undulations of the ground over which the machine is being moved, and cotton picking mechanism in each of said machine bodies, said cotton picking mechanism including rotating disks and means on said disks to pick cotton from the ground adjacent to cotton plants.

17. A cotton picking machine including a running gear, there being a main axle in said running gear, two machine bodies, said machine bodies being spaced a sufficient distance apart to permit cotton plants to pass bodily between them, the passage thus formed being unobstructed, each of said machine bodies being pivoted to said main axle independently of the other and free at its rear end to follow the undulations of the ground over which the machine is being moved, and cotton picking mechanism in each of said machine bodies, said cotton picking mechanism including rotating disks, and means on said disks adapted to pick cotton from the ground adjacent to cotton plants.

18. A cotton picking machine including a running gear, there being a main axle in said running gear, two machine bodies, said machine bodies being spaced a sufficient distance apart to permit cotton plants to pass bodily between them, the passage thus formed being unobstructed, said machine bodies being pivoted to said main axle independently of each other and free at their rear ends to follow the ground over which the machine is being moved, and cotton picking mechanism in each of said machine bodies, said cotton picking mechanism including rotating disks and means on said disks adapted to pick cotton from the ground adjacent to cotton plants, said cotton picking mechanism being located at the rear end of each of said machine bodies.

19. A cotton picking machine including a running gear, there being a main axle in said running gear, two machine bodies, said machine bodies being placed a sufficient distance apart to permit cotton plants to pass bodily between them, the passage thus formed being unobstructed, said machine bodies being pivoted to said main axle independently of each other and free to follow the undulations of the ground over which the machine is being moved, and cotton picking mechanism in each of said machine bodies, said cotton picking mechanism including rotating disks and means on said disks adapted to pick cotton from the ground adjacent to cotton plants, said cotton picking mechanism being located at the rear end of each of said machine bodies.

20. A cotton picking machine including a running gear, there being a main axle in said running gear; two separate machine bodies pivoted to said main axle, and spaced a sufficient distance apart to permit cotton plants to pass bodily between them, the passage thus formed being unobstructed, each of said machine bodies being free to follow the undulations of the ground over which the machine is being moved independently of the other, and cotton picking mechanism in each of said machine bodies and including rotating disks there being picking fingers projecting from the periphery of said disks adapted to pick cotton from the ground over which the machine is moving and adjacent to cotton plants.

21. A cotton picking machine including a running gear, there being a main axle in said running gear; two separate machine bodies pivoted to said main axle, and spaced a sufficient distance apart to permit cotton plants to pass bodily between them, the passage thus formed being unobstructed, each of said machine bodies being free at its rear end to follow the ground over which the machine is being moved independently of the other, and cotton picking mechanism in each of said machine bodies and including rotating disks, there being picking fingers projecting from the peripheries of said disks adapted to pick cotton from the ground adjacent to cotton plants.

22. A cotton picking machine including a running gear, there being a main axle in said running gear; two separate machine bodies pivoted to said main axle, and spaced a sufficient distance apart to permit cotton plants to pass bodily between them, the passage thus formed being unobstructed, each of said machine bodies being free to follow the undulations of the ground over which the machine is being moved independently of the other, and cotton picking mechanism in each of said machine bodies and including rotating disks, there being picking fingers projecting from the peripheries of said disks adapted to pick cotton from the ground adjacent to cotton plants, said cotton picking mechanism being located at the rear end of each of said machine bodies.

23. A cotton picking machine including a running gear, there being a main axle in said running gear; two separate machine bodies pivoted to said main axle, and spaced a sufficient distance apart to permit cotton plants to pass bodily between them, the passage thus formed being unobstructed, each of said machine bodies being free at the rear end to follow the undulations of the ground over which the machine is being moved independently of the other, and cotton picking mechanism in each of said machine bodies and including rotating disks, there being picking fingers projecting from the peripheries of said disks adapted to pick cotton from the ground adjacent to cotton plants, said cotton picking mechanism being located at the rear end of each of said machine bodies.

24. A cotton picking machine including a running gear, there being a main axle in said running gear; two separate machine bodies pivoted to said main axle, and spaced a sufficient distance apart to permit cotton plants to pass bodily between them, the passage thus formed being unobstructed, each of said machine bodies being free to follow the undulations of the ground over which the machine is being moved independently of the other; cotton picking mechanism in each of said machine bodies, said cotton picking mechanism including rotating disks, and means on said disks adapted to pick cotton from the ground adjacent to cotton plants, said means including picking fingers, said picking fingers being removably inserted in said disks.

25. A cotton picking machine including a running gear, there being a main axle in said running gear; two separate machine bodies pivoted to said main axle, and spaced a sufficient distance apart to permit cotton plants to pass bodily between them, the passage thus formed being unobstructed, each of said machine bodies being free at the rear end to follow the undulations of the ground over which the machine is being moved independently of the other; cotton picking mechanism in each of said machine bodies including rotating disks, and means on said disks adapted to pick cotton from the ground adjacent to cotton plants, said means including picking fingers, said picking fingers being removably inserted in said disks.

26. A cotton picking machine including a running gear; there being a main axle in said running gear; two separate machine bodies pivoted to said main axle and spaced a sufficient distance apart to permit cotton plants to pass bodily between them, the passage thus formed being unobstructed, each of said machine bodies being free to follow the undulations of the ground over which the machine is being moved, independently of the other; cotton picking mechanism in each of said machine bodies including rotating disks, and means on said disks adapted to pick cotton from the ground adjacent to cotton plants, said means including picking fingers projecting from the peripheries of said disks, said picking fingers being removably secured to said disks, said cotton picking mechanism being located at the rear end of each of said machine bodies.

27. A cotton picking machine including a running gear; there being a main axle in said running gear; two separate machine bodies pivoted to said main axle and spaced a sufficient distance apart to permit cotton plants to pass bodily between them, the passage thus formed being unobstructed, each of said machine bodies being free at the rear end to follow the undulations of the ground over which the machine is being moved independently of the other; cotton picking mechanism in each of said machine bodies and including rotating disks, and means on said disks adapted to pick cotton from the ground adjacent to cotton plants, said means including picking fingers projecting from the peripheries of said disks, said picking fingers being removably secured to said disks, said cotton picking mechanism being located at the rear end of each of said machine bodies.

28. A cotton picking machine including a running gear, there being a main axle in said running gear, two machine bodies, said machine bodies being placed a sufficient distance apart to permit cotton plants to pass bodily between them the passage thus formed being unobstructed, each of said machine bodies being pivoted to said main axle independently of the other and free to follow the undulations of the ground over which the machine is being moved independently of the other; cotton picking mechanism in each of said machine bodies including rotating disks, and means on said disks adapted to pick cotton from the ground adjacent to cotton plants, the means on said disks including picking fingers projecting from the peripheries of said disks, said picking fingers being pointed.

29. A cotton picking machine including a running gear, there being a main axle in said running gear, two machine bodies, said machine bodies being placed a sufficient distance apart to permit cotton plants to pass bodily between them, the passage thus formed being unobstructed, each of said machine bodies being pivoted to said main axle independently of the other and free at the rear end to follow the undulations of the ground over which the machine is being moved independently of the other; cotton picking mechanism in each of said machine bodies including rotating disks, and means on said disks adapted to pick cotton from the ground adjacent to cotton plants, the means on said disks including picking fingers projecting from the peripheries of said disks, said picking fingers being pointed.

30. A cotton picking machine including a running gear, there being a main axle in said running gear, two machine bodies, said machine bodies being placed a sufficient distance apart to permit cotton plants to pass bodily between them, the passage thus formed being unobstructed, each of said machine bodies being pivoted to said main axle independently of the other and free to follow the undulations of the ground over which the machine is being moved independently of the other; cotton picking mechanism in each of said machine bodies including rotating disks, and means on said disks, adapted to pick cotton from the ground adjacent to cotton plants, the means on said disks including picking fingers projecting from the peripheries of said disks, said picking fingers being pointed, the picking mechanism being located at the end of each machine body.

31. A cotton picking machine including a running gear, there being a main axle in said running gear, two machine bodies, said machine bodies being placed a sufficient distance apart to permit cotton plants to pass bodily between them, the passage thus formed being unobstructed, each of said machine bodies being pivoted to said main axle independently of the other and free at the rear end to follow the undulations of the ground over which the machine is being moved independently of the other; cotton picking mechanism in each of said machine bodies including rotating disks, and means on said disks adapted to pick cotton from the ground adjacent to cotton plants, the means on said disks including picking fingers projecting from the peripheries of said disks, said picking fingers being pointed said picking mechanism being located at the rear end of each of said machine bodies.

32. A cotton picking machine including a running gear; there being a main axle in said running gear; two separate machine bodies, said machine bodies being spaced a sufficient distance apart to permit cotton plants to pass bodily between them, the passage thus formed being unobstructed, said machine bodies being free to follow the undulations of the ground over which the machine is being moved independently of each other; cotton picking mechanism in each of said machine bodies and including rotating disks, and means on said disks adapted to pick cotton from the ground adjacent to cotton plants, the means on said disks including picking fingers projecting from the peripheries of said disks, said picking fingers being pointed and removably secured to said disks.

33. A cotton picking machine including a running gear; there being a main axle in said running gear; two separate machine bodies, said machine bodies being spaced a sufficient distance apart to permit cotton plants to pass bodily between them, the passage thus formed being unobstructed, said machine bodies being free at their rear ends to follow the undulations of the ground over which the machine is being moved independently of each other; cotton picking mechanism in each of said machine bodies and including rotating disks, and means on said disks adapted to pick cotton from the ground adjacent to cotton plants, the means on said disks including picking fingers projecting from the peripheries of said disks, said picking fingers being pointed and removably secured to said disks.

34. A cotton picking machine including a running gear; there being a main axle in said running gear; two separate machine bodies, said machine bodies being spaced a sufficient distance apart to permit cotton plants to pass bodily between them, the passage thus formed being unobstructed, said machine bodies being free to follow the undulations of the ground over which the machine is being moved independently of each other; cotton picking mechanism in each of said machine bodies and including rotating disks, and means on said disks adapted to pick cotton from the ground adjacent to cotton plants, the means on said disks including picking fingers projecting from the peripheries of said disks, said picking fingers being removably secured to said disks, said picking mechanism being located at the rear end of each of said machine bodies.

35. A cotton picking machine including a running gear; there being a main axle in said running gear; two separate machine bodies, said machine bodies being spaced a sufficient distance apart to permit cotton plants to pass bodily between them, the passage thus formed being unobstructed, said machine bodies being free at the rear end to follow the undulations of the ground over which the machine is being moved independently of each other; cotton picking mechanism in each of said machine bodies and including rotating disks, and means on said disks adapted to pick cotton from the ground adjacent to cotton plants, the means on said disks including picking fingers projecting from the peripheries of said disks and removably attached to said disks, said picking mechanism being located at the rear end of each of said machine bodies.

36. In a cotton picking machine a running gear including a main axle; two separate machine bodies pivoted to said main axle and spaced a sufficient distance apart to permit cotton plants to pass bodily between them, the passage thus formed being unobstructed, said bodies being free to follow the undulations of the ground over which the machine is being moved independently of each other; cotton picking mechanism in each of said machine bodies including rotating disks adapted to pick cotton from the ground adjacent to cotton plants; a receptacle at the rear end of each of said machine bodies, a compartment in front of said receptacle, and a slotted wall between the compartment and the receptacle through which the picking-disks protrude from the compartment toward the receptacle.

37. A cotton picking machine including a running gear including a main axle; two separate machine bodies pivoted to said main axle and spaced a sufficient distance apart to permit cotton plants to pass bodily between them, the passage thus formed being unobstructed, said machine bodies being free at their rear ends to follow the undulations of the ground over which the machine is being moved independently of each other; cotton picking mechanism in each of said machine bodies and including rotating disks adapted to pick cotton from the ground adjacent to cotton plants; a receptacle at the rear end of each of said machine bodies, a compartment in front of said receptacle wherein said picking-disks are located, and a slotted wall between the compartment and the receptacle through which the picking-disks protrude from the compartment toward the receptacle.

38. A cotton picking machine including a running gear including a main axle; two separate machine bodies pivoted to said main axle and spaced a sufficient distance apart to permit cotton plants to pass bodily between them, the passage thus formed being unobstructed, said machine bodies being free to follow the undulations of the ground over which the machine is being moved independently of each other; cotton picking mechanism in each of said machine bodies and including rotating picking disks adapted to pick cotton from the ground adjacent to cotton plants; a compartment wherein said picking-disks are located; a receptacle adapted to receive the gathered trash, and a slotted wall between the compartment and the trash-receptacle through which the picking-disks protrude from the compartment toward the trash-receptacle, said picking mechanism being located at the rear end of each of said machine bodies.

39. A cotton picking machine, including two machine-bodies pivoted to the main axle and spaced a sufficient distance apart to permit cotton plants to pass bodily between them, the passage thus formed being unobstructed, said machine bodies being free at their rear ends to follow the undulations of the ground over which the machine is being moved independently of each other; cotton-picking mechanism in each of said machine-bodies and including rotating picking-disks adapted to pick cotton from the ground adjacent to cotton plants; a compartment near the rear end of each machine-body, and a trash-receptacle at the rear end of each machine-body, there being a slotted wall between the compartment and the trash-receptacle through which the picking-disks protrude from the compartment toward said trash-receptacle, said picking-mechanism being located at the rear end of each of said compartments.

40. A cotton picking machine including a running gear including a main axle; two separate machine bodies pivoted to said main axle and spaced a sufficient distance apart to permit cotton plants to pass bodily between them, the passage thus formed being unobstructed, each of said machine bodies being free to follow the undulations of the ground over which the machine is being moved independently of the other; cotton picking mechanism in each of said machine bodies and including rotating disks adapted to pick cotton from the ground adjacent to cotton plants; a receptacle at the end of each of said machine bodies within which trash may be collected; a compartment within which said picking mechanism is located; a grate affording a dividing wall between the trash-receptacle and the compartment in each machine body through which the picking-disks protrude from the compartment toward the trash-receptacle, said cotton picking disks being adapted to protrude from the lower end of said machine bodies to pick the scattered cotton.

41. A cotton picking machine including a running gear including a main axle; two separate machine bodies pivoted to said main axle and spaced a sufficient distance apart to permit cotton plants to pass bodily between them, the passage thus formed being unobstructed, each of said machine bodies being free at the rear end to follow the undulations of the ground over which the machine is being moved independently of each other; cotton picking mechanism in each machine body and including rotating disks; a receptacle at the rear end of each machine body within which trash may be collected; a compartment in each machine body wherein the picking mechanism is located; a grate affording a dividing wall between the trash receptacle and the compartment in each machine body through which the picking-disks protrude from the compartment toward the trash receptacle, said cotton picking mechanism being adapted to protrude from the lower end of said machine bodies to pick the scattered cotton from the ground adjacent to cotton plants.

42. A cotton picking machine including a running gear including a main axle; two separate machine bodies pivoted to said main axle and spaced a sufficient distance apart to permit cotton plants to pass bodily between them, the passage thus formed being unobstructed, each of said machine bodies being free to follow the undulations of the ground over which the machine is being moved independently of the other, each machine body comprising cotton picking mechanism including rotating disks; a receptacle at the rear end wherein trash is adapted to be received; a compartment wherein the picking mechanism is located; a grate affording a dividing wall between the said receptacle and the compartment through which the picking-disks protrude from the compartment toward said receptacle, said picking disks being adapted to protrude from the lower end of the machine body, and means for preventing the picking disks from entering the ground over which they are moving to pick cotton from the ground adjacent to cotton plants.

43. A cotton picking machine including a running gear including a main axle; two separate machine bodies pivoted to said main axle and spaced a sufficient distance apart to permit cotton plants to pass bodily between them, the passage thus formed being unobstructed, each of said machine bodies being free at the rear end to follow the undulations of the ground independently of the other, each machine body comprising cotton picking mechanism including rotating disks; a receptacle at the rear end wherein trash is adapted to be received; a compartment wherein the picking mechanism is located; a grate affording a dividing wall between the said receptacle and the compartment through which the picking-disks protrude from the compartment toward said receptacle, said picking disks being adapted to protrude from the lower end of the machine body; means for preventing the picking disks from entering the ground over which they are moving to pick cotton from the ground adjacent to cotton plants, said means being located at the end of said machine body.

44. A cotton picking machine comprising a running gear including a main axle; two separate machine bodies spaced a sufficient distance apart to permit cotton plants to pass bodily between them, the passage thus formed being unobstructed, each of said machine bodies being pivoted to said main axle and free to follow the undulations of the ground over which the machine is being moved independently of the other, there being in each machine body cotton picking mechanism adapted to pick cotton from the ground adjacent to cotton plants; means for removing the gathered cotton from the picking mechanism, and means for transmitting the picked cotton to receptacles adapted to receive the same.

45. A cotton picking machine comprising a running gear including a main axle; two separate machine bodies spaced a sufficient distance apart to permit cotton plants to pass bodily between them, the passage thus formed being unobstructed, each of said machine bodies being pivoted to said main axle and free at the rear end to follow the undulations of the ground over which the machine is being moved independently of the other, there being in each machine body cotton picking mechanism adapted to pick cotton from the ground adjacent to cotton plants; means for removing the gathered cotton from the picking mechanism, and means for transmitting the picked cotton to receptacles adapted to receive the same.

46. A cotton picking machine comprising a running gear including a main axle; two separate machine bodies spaced a sufficient distance apart to permit cotton plants to pass bodily between them, the passage thus formed being unobstructed, each of said machine bodies being pivoted to said main axle and free to follow the undulations of the ground over which the machine is being moved independently of the other, there being in each machine body cotton picking mechanism adapted to pick cotton from the ground adjacent to cotton plants; means for removing the gathered cotton from the picking mechanism, and means for transmitting the picked cotton to receptacles adapted to receive the same, said cotton picking mechanism being located at the rear end of said machine body.

47. A cotton picking machine comprising a running gear including a main axle; two separate machine bodies spaced a sufficient distance apart to permit cotton plants to pass bodily between them, the passage thus formed being unobstructed, each of said machine bodies being pivoted to said main axle and free at the rear end to follow the undulations of the ground over which the machine is being moved independently of the other, there being in each machine body cotton picking mechanism adapted to pick cotton from the ground adjacent to cotton plants; means for removing the gathered cotton from the picking mechanism, and means for transmitting the picked cotton to receptacles adapted to receive the same, said cotton picking mechanism being located at the rear end of said machine body.

48. A cotton picking machine comprising a running gear including a main axle; two separate machine bodies spaced a sufficient distance apart to permit cotton plants to pass bodily between them, the passage thus formed being unobstructed, each of said bodies being pivoted to said main axle and free to follow the undulations of the ground over which the machine is being moved independently of the other, there being in each machine body cotton picking mechanism adapted to pick cotton from the ground adjacent to cotton plants; means for separating the picked cotton from the trash; means for removing the picked cotton from the picking mechanism, and means for transmitting the picked cotton to receptacles adapted to receive the same.

49. A cotton picking machine comprising a running gear including a main axle; two separate machine bodies spaced a sufficient distance apart to permit cotton plants to pass bodily between them, the passage thus formed being unobstructed, each of said machine bodies being pivoted to said main axle and free at the rear end to follow the undulations of the ground over which the machine is being moved independently of the other; there being in each machine body cotton picking mechanism adapted to pick cotton from the ground adjacent to cotton plants; means for separating the picked cotton from the trash; means for removing the picked cotton from the picking mechanism, and means for transmitting the picked cotton to receptacles adapted to receive the same.

50. A cotton picking machine comprising a running gear including a main axle; two separate machine bodies spaced a sufficient distance apart to permit cotton plants to pass bodily between them, the passage thus formed being unobstructed, each of said machine bodies being pivoted to said main axle and free to follow the undulations of the ground over which the machine is being moved, independently of the other; there being in each machine body cotton picking mechanism adapted to pick cotton from the ground adjacent to cotton plants; means for separating the picked cotton from the trash; means for removing the picked cotton from the picking mechanism, and means for transmitting the picked cotton to receptacles adapted to receive the same, said cotton picking mechanism being located at the rear end of said machine body.

51. A cotton picking machine comprising a running gear including a main axle; two separate machine bodies spaced a sufficient distance apart to permit cotton plants to pass bodily between them, the passage thus formed being unobstructed, each of said machine bodies being pivoted to said main axle and free at the rear end to follow the undulations of the ground over which the machine is being moved independently of the other, there being in each machine body cotton picking mechanism adapted to pick cotton from the ground adjacent to cotton plants; means for separating the picked cotton from the trash; means for removing the picked cotton from the picking mechanism, and means for transmitting the picked cotton to receptacles adapted to receive the same, said cotton picking mechanism being located at the rear end of said machine body.

52. A cotton picking machine comprising a running gear including a main axle; two separate machine bodies spaced a sufficient distance apart to permit cotton plants to pass bodily between them, the passage thus formed being unobstructed, each of said machine bodies being pivoted to said main axle and free to follow the undulations of the ground over which the machine is being moved independently of the other, there being in each machine body cotton picking mechanism including rotating disks adapted to pick cotton from the ground adjacent to cotton plants; means for removing the picked cotton from the picking disks and including brushes adapted to enter the space within which the picking disks are revolving and to intercept the cotton thereon, and means for transmitting the picked cotton to receptacles adapted to receive the same.

53. A cotton picking machine comprising a running gear including a main axle; two separate machine bodies spaced a sufficient distance apart to permit cotton plants to pass bodily between them, the passage thus formed being unobstructed, each of said machine bodies being pivoted to said main axle and free at the rear end to follow the undulations of the ground over which the machine is being moved independently of the other; there being in each machine body cotton picking mechanism including rotating disks adapted to pick cotton from the ground adjacent to cotton plants; means for removing the picked cotton from the picking disks and including brushes adapted to contact with the peripheries of the picking disks and to intercept the cotton thereon, and means for transmitting the picked cotton to receptacles adapted to receive the same.

54. A cotton picking machine comprising a running gear including a main axle; two separate machine bodies spaced a sufficient distance apart to permit cotton plants to pass bodily between them, the passage thus formed being unobstructed, each of said machine bodies being pivoted to said main axle and free to follow the undulations of the ground over which the machine is being moved independently of the other, there being in each machine body cotton picking mechanism including rotating disks adapted to pick cotton from the ground adjacent to cotton plants; means for removing the picked cotton from the picking disks and including brushes adapted to contact with the peripheries of said picking disks to intercept the cotton thereon, and means for transmitting the picked cotton to receptacles adapted to receive the same, said cotton picking mechanism being located at the rear end of said machine body.

55. A cotton picking machine comprising a running gear including a main axle; two separate machine bodies spaced a sufficient distance apart to permit cotton plants to pass bodily between them, the passage thus formed being unobstructed, each of said machine bodies being pivoted to said main axle and free at the rear end to follow the undulations of the ground over which the machine is being moved independently of the other, there being in each machine body cotton picking mechanism including rotating disks adapted to pick cotton from the ground adjacent to cotton plants; means for removing the picked cotton from the picking disks and including brushes adapted to contact with the peripheries of said picking disks and to intercept the cotton thereon, and means for transmitting the picked cotton to receptacles adapted to receive the same, said cotton picking mechanism being located at the rear end of said machine body.

56. A cotton picking machine comprising a running gear including a main axle; two separate machine bodies spaced a sufficient distance apart to permit cotton plants to pass bodily between them, the passage thus formed being unobstructed, each of said machine bodies being pivoted to said main axle and free to follow the undulations of the ground over which the machine is being moved independently of the other, there being in each machine body cotton picking mechanism including rotating disks adapted to pick cotton from the ground adjacent to cotton plants; means for removing the picked cotton from the picking disks and including rotating brushes adapted to enter the space within which the picking disks revolve and to intercept the cotton thereon, and means for transmitting the picked cotton to receptacles adapted to receive the same.

57. A cotton picking machine comprising a running gear including a main axle; two separate machine bodies spaced a sufficient distance apart to permit cotton plants to pass bodily between them, the passage thus formed being unobstructed, each of said machine bodies being pivoted to said main axle and free at the rear end to follow the undulations of the ground over which the machine is being moved independently of the other, there being in each machine body cotton picking mechanism including rotating disks adapted to pick cotton from the ground adjacent to cotton plants; means for removing the picked cotton from the picking disks and including rotating brushes adapted to enter the space within which the picking disks are revolving and to intercept the cotton thereon, and means for transmitting the picked cotton to receptacles adapted to receive the same.

58. A cotton picking machine comprising a running gear including a main axle; two separate machine bodies spaced a sufficient distance apart to permit cotton plants to pass bodily between them, the passage thus formed being unobstructed, each of said machine bodies being pivoted to said main axle and free to follow the undulations of the ground over which the machine is being moved independently of the other, there being in each machine body cotton picking mechanism including rotating disks adapted to pick cotton from the ground adjacent to cotton plants; means for removing the picked cotton from the picking disks and including rotating brushes adapted to enter the space within which the picking disks revolve and to intercept the cotton thereon; and means for transmitting the picked cotton to receptacles adapted to receive the same, said picking mechanism being located at the rear end of said machine body.

59. A cotton picking machine comprising a running gear including a main axle: two separate machine bodies spaced a sufficient distance apart to permit cotton plants to pass bodily between them, the passage thus formed being unobstructed, each of said machine bodies being pivoted to said main axle and free at the rear end to follow the undulations of the ground over which the machine is being moved independently of the other, there being in each machine body cotton picking mechanism including rotating disks adapted to pick cotton from the ground adjacent to cotton plants; means for removing the picked cotton from the picking mechanism and including rotating brushes adapted to enter the space within which the picking disks are revolving and to intercept the cotton thereon, and means for transmitting the picked cotton to receptacles adapted to receive the same, said picking mechanism being located at the rear end of said machine body.

60. A cotton picking machine comprising a running gear including a main axle; two separate machine bodies spaced a sufficient distance apart to permit cotton plants to pass bodily between them, the passage thus formed being unobstructed, each of said machine bodies being pivoted to said main axle and free to follow the undulations of the ground over which the machine is being moved independently of the other, there being in each machine body cotton picking mechanism including rotating disks adapted to pick cotton from the ground adjacent to cotton plants; means for removing the picked cotton from the picking disks and including brushes adapted to enter the space within which the picking mechanism revolves and to intercept the cotton thereon, and means for transmitting the picked cotton to receptacles adapted to receive the same, the latter means including an air-current producing device.

61. A cotton picking machine comprising a running gear including a main axle; two separate machine bodies spaced a sufficient distance apart to permit cotton plants to pass bodily between them, the passage thus formed being unobstructed, each of said machine bodies being pivoted to said main axle and free at the rear end to follow the undulations of the ground over which the machine is being moved independently of the other, there being in each machine body cotton picking mechanism including rotating disks adapted to pick cotton from the ground adjacent to cotton plants; means for removing the picked cotton from the picking disks and including brushes adapted to enter the space within which the picking disks are revolving and to intercept the cotton thereon, and means for transmitting the picked cotton to receptacles adapted to receive the same, the latter means including an air-current producing device.

62. A cotton picking machine comprising a running gear including a main axle; two separate machine bodies spaced a sufficient distance apart to permit cotton plants to pass bodily between them, the passage thus formed being unobstructed, each of said machine bodies being pivoted to said main axle and free at the rear end to follow the undulations of the ground over which the machine is being moved, there being in each machine body cotton picking mechanism including rotating disks adapted to pick cotton from the ground adjacent to cotton plants; means for removing the picked cotton from the picking disks and including brushes adapted to enter the space within which the picking disks revolve and to intercept the cotton thereon, and means for transmitting the picked cotton to receptacles adapted to receive the same, the latter means including an air-current producing device, the picking mechanism being located at the rear end of the machine body.

63. A cotton picking machine comprising a running gear including a main axle; two separate machine bodies spaced a sufficient distance apart to permit cotton plants to pass bodily between them, the passage thus formed being unobstructed each of said machine bodies being pivoted to said main axle and free at the rear end to follow the undulations of the ground over which the machine is being moved, independently of the other, there being in each machine body cotton picking mechanism including rotating disks adapted to pick cotton from the ground adjacent to cotton plants; means for removing the picked cotton from the picking disks and including brushes adapted to enter the space within which the picking disks are revolving and to intercept the cotton thereon, and means for transmitting the picked cotton to receptacles adapted to receive the same, the latter means including an air-current producing device, said cotton picking mechanism being located at the rear end of said machine body.

64. A cotton picking machine comprising a running gear including a main axle; two separate machine bodies placed a sufficient distance apart to permit cotton plants to pass between them, the passage thus formed being unobstructed, each of said machine bodies being provided with cotton picking mechanism including rotating disks adapted to pick cotton from the ground adjacent to cotton plants; means for removing the picked cotton from the picking disks, and means for transmitting the picked cotton to receptacles adapted to receive the same, said cotton removing and cotton transmitting means including a fan blower having a series of fan-plates, there being brushes along the outer edges of said fan-plates adapted to contact with the peripheries of the picking disks.

65. A cotton picking machine comprising a running gear including a main axle; a machine body pivoted to said main axle and free to follow the undulations of the ground over which the machine is being moved; cotton picking mechanism in said machine body and including rotating disks adapted to pick cotton from the ground over which the machine is being moved, means for removing the picked cotton from the picking disks, and means for transmitting the picked cotton to receptacles adapted to receive the same, said cotton removing and cotton transmitting means including a fan blower having a series of rotating fan-plates, there being brushes along the outer edges of said fan-plates and adapted to contact with the peripheries of the picking disks.

66. A cotton picking machine comprising a running gear including a main axle; two separate machine bodies placed a sufficient distance apart to permit cotton plants to pass bodily between them, the passage thus formed being unobstructed, said machine bodies being pivoted to said main axle and free to follow the undulations of the ground over which the machine is being moved, there being in each machine body cotton picking mechanism including rotating disks adapted to pick cotton from the ground adjacent to cotton plants; means for removing the picked cotton from the picking disks, and means for transmitting the picked cotton to receptacles adapted to receive the same, said cotton removing and the cotton transmitting means including a fan blower having a series of fan-plates, there being brushes along the outer edges of said fan-plates adapted to contact with the peripheries of the picking disks.

67. A cotton picking machine comprising a running gear including a main axle; a machine body pivoted to said main axle and free at its rear end to follow the undulations of the ground over which the machine is being moved; cotton picking mechanism in said machine body and including rotating disks adapted to pick cotton from the ground adjacent to cotton plants; means for removing the picked cotton from the picking disks, and means for transmitting the picked cotton to receptacles adapted to receive the same, said cotton removing and cotton transmitting means including a fan blower having a series of rotating fan-plates, there being brushes along the outer edges of said fan-plates adapted to contact with the peripheries of the picking disks.

68. A cotton picking machine comprising a running gear including a main axle; two machine bodies spaced a sufficient distance apart to permit cotton plants to pass bodily between them, the passage thus formed being unobstructed, each machine body being pivoted to said main axle and free at the rear end to follow the undulations of the ground over which the machine is being moved, there being in each machine body cotton picking mechanism including rotating disks adapted to pick cotton from the ground adjacent to cotton plants; means for removing the picked cotton from the picking disks, and means for transmitting the picked cotton to receptacles adapted to receive the same, said cotton removing and cotton transmitting means including a fan blower having a series of rotating fan-plates, there being brushes along the outer edges of the fan-plates adapted to contact with the peripheries of said picking disks.

69. A cotton picking machine comprising a running gear including a main axle; a machine body, said machine body being pivoted to said main axle and free to follow the undulations of the ground over which the machine is being moved; cotton picking mechanism in said machine body and including rotating disks adapted to pick cotton from the ground adjacent to cotton plants; means for removing the picked cotton from the picking disks, and means for transmitting the picked cotton to receptacles adapted to receive the same, said cotton removing and cotton transmitting means including a fan blower having a series of fan-plates, there being brushes along the outer edges of said fan-plates adapted to contact with the peripheries of the picking disks, said picking mechanism being located at the rear end of said machine body.

70. A cotton picking machine comprising a running gear including a main axle; two machine bodies spaced a sufficient distance apart to permit cotton plants to pass bodily between them, the passage thus formed being unobstructed, each of said machine bodies being pivoted to said main axle and free at the rear end to follow the undulations of the ground over which the machine is being moved independently of the other, there being in each machine body cotton picking mechanism including rotating disks adapted to pick cotton from the ground adjacent to cotton plants; means for removing the picked cotton from the picking disks, and means for transmitting the picked cotton to receptacles adapted to receive the same, said cotton removing and cotton transmitting means including a fan blower having a series of rotating fan-plates, there being brushes along the outer edges of said fan-plates adapted to contact with the peripheries of said picking disks, said picking mechanism being located at the rear end of said machine body.

71. A cotton harvester, comprising a running-gear including a main axle and traction-wheels thereon; a machine-body supported by said running-gear; cotton-picking mechanism in said machine-body and adapted to pick cotton lint from the ground over which the harvester is being moved, said machine-body being laterally tiltable; and means whereby said machine-body may be held in a tilted position.

72. A cotton harvester, comprising a running-gear including a main axle and traction-wheels thereon; two machine-bodies supported by said running-gear, said machine-bodies being spaced a sufficient distance apart to permit cotton plants to pass bodily between them, the passage thus formed being unobstructed; cotton-picking mechanism in each of said machine-bodies and adapted to pick cotton lint from the ground over which the harvester is being moved; and means whereby said machine-bodies may be held in a laterally tilted position.

73. A cotton harvester, comprising a running-gear including a main axle and traction-wheels thereon; a machine-body supported by said running-gear; cotton-picking mechanism in said machine-body, said machine-body being free to follow the undulations of the ground to pick cotton lint from the ground over which the machine is being moved; means for operating said cotton-picking mechanism, said machine-body being laterally tiltable, and means whereby said machine-body may be held in a tilted position.

74. A cotton harvester, comprising a running-gear including a main axle and traction-wheels thereon; two machine-bodies supported by said running-gear, said machine-bodies being spaced a sufficient distance apart to permit cotton plants to pass bodily between them, the passage thus formed being unobstructed, said machine-bodies being free to follow the undulations of the ground to pick cotton from the ground over which the harvester is being moved; means for operating said cotton-picking mechanism, said machine-bodies being laterally tiltable, and means whereby said machine-bodies may be held in a tilted position.

75. A cotton harvester, comprising a running-gear including a main axle and traction-wheels thereon; a machine-body supported by said running-gear; cotton-picking mechanism in said machine-body, said machine-body being free at its rear end to follow the undulations of the ground to pick cotton lint from the ground over which the harvester is being moved; shoes at the rear end of said machine-body; means for operating said cotton-picking mechanism, said machine-body being laterally tiltable and provided with means for retaining it in a tilted position.

76. A cotton harvester comprising a running-gear including a main axle and traction-wheels thereon; two machine-bodies supported by said running-gear, said machine-bodies being spaced a sufficient distance apart to permit cotton plants to pass bodily between them, the passage thus formed being unobstructed, said machine-bodies being free at their rear ends to follow the undulations of the ground to pick cotton lint from the ground over which the harvester is being moved; shoes at the rear end of each of said machine-bodies; means in each of said machine-bodies for operating the cotton-picking mechanism therein, said machine-bodies being laterally tiltable in opposite directions and provided with means for retaining them in a tilted position.

77. A cotton harvester, comprising a running-gear including a main axle and traction-wheels thereon; a machine-body supported by said running-gear; cotton-picking mechanism in said machine-body, said machine-body being free to follow the undulations of the ground over which the harvester is being moved; means on said machine-body adapted to prevent the cotton-picking means from entering the ground, said means including shoes; and means for operating the cotton-picking mechanism, said machine-body being laterally tiltable and provided with means whereby the machine-body may be held in a tilted position.

78. A cotton harvester, comprising a running-gear including a main axle and traction-wheels thereon, two machine-bodies supported by said running-gear, said machine-bodies being spaced a sufficient distance apart to permit cotton plants to pass bodily between them, the passage thus formed being unobstructed, said machine-bodies being free to follow the undulations of the ground over which the harvester is being moved; means on each of said machine-bodies adapted to prevent the cotton-picking means from entering the ground, said means including shoes; and means for operating the cotton-picking mechanisms, said machine-bodies being laterally tiltable and provided with means whereby the machine-bodies may be held in a tilted position.

79. A cotton harvester comprising a running-gear including a main axle and traction-wheels thereon; a machine-body supported by said traction-wheels and axle; cotton-picking mechanism in said machine-body, said cotton-picking mechanism being adapted to pick cotton lint from the ground over which the harvester is being moved; means for operating said picking-mechanism, and means for preventing the cotton-picking means from entering the ground while picking cotton therefrom, the latter means including shoes adapted to slide over the ground and to sustain the cotton-picking mechanism in proper position relative to the ground.

80. A cotton picking machine including a machine body, there being in said machine body cotton picking mechanism adapted to pick cotton from the ground adjacent to cotton plants, said cotton picking mechanism including picking means proper, means for removing the cotton from the picking means, and means for transmitting the cotton to receptacles adapted to receive the same, and a depressor in front of the picking means, and in close proximity thereto, said depressor being adapted to push the cotton upon, and to hold trash to, the ground while the picking means are removing cotton therefrom.

81. A cotton picking machine including two machine bodies spaced a sufficient distance apart to permit cotton plants to pass bodily between them, the passage thus formed being unobstructed, there being in each machine body cotton picking mechanism adapted to pick cotton from the ground adjacent to cotton plants, said cotton picking mechanism including picking means proper, means for removing the cotton from the picking means, and means for transmitting the cotton to receptacles adapted to receive the same, and a depressor in front of, and in close proximity to, the picking means, said depressor being adapted to push the cotton upon, and to hold trash to, the ground while the picking means are removing cotton therefrom.

82. A cotton picking machine comprising a running gear including a main axle; a machine body, said machine body being pivoted to said main axle and free to follow the undulations of the ground over which the machine is being moved; cotton picking mechanism in said machine body and adapted to pick cotton from the ground adjacent to cotton plants, said cotton picking mechanism including picking means proper, means for removing the cotton from the picking means, and means for transmitting the cotton to receptacles adapted to receive the same and a depressor in front of, and in close proximity to the picking mechanism, said depressor being adapted to push the cotton upon, and to hold trash to, the ground while the picking means are removing cotton therefrom.

83. A cotton picking machine comprising a running gear including a main axle; two machine bodies spaced a sufficient distance apart to permit cotton plants to pass bodily between them, the passage thus formed being unobstructed, said machine bodies being pivoted to said main axle and free to follow the undulations of the ground over which the machine is being moved independently of the other, there being in each machine body cotton picking mechanism adapted to pick cotton from the ground adjacent to cotton plants, said cotton picking mechanism including picking means proper, means for removing the cotton from the picking means, and means for transmitting the cotton to receptacles adapted to receive the same, and a depressor in front of and in close proximity to the picking means, said depressor being adapted to push the cotton upon and to hold trash to, the ground while the picking means are removing cotton therefrom.

84. A cotton picking machine comprising a running gear including a main axle; a machine body, said body being pivoted to said main axle and free at the rear end to follow the undulations of the ground over which the machine is being moved; cotton picking mechanism in said machine body and adapted to pick cotton from the ground adjacent to cotton plants, said picking mechanism including picking means proper, means for removing the cotton from the picking means, and means for transmitting the cotton to receptacles adapted to receive the same, and a depressor in front of, and in close proximity to, said picking means, said depressor being adapted to push the cotton upon, and to hold trash to, the ground while the picking means are removing cotton therefrom.

85. A cotton picking machine comprising a running gear including a main axle; two machine bodies spaced a sufficient distance apart to permit cotton plants to pass bodily between them, the passage thus formed being unobstructed, each of said machine bodies being pivoted to said main axle and free at the rear end to follow the undulations of the ground over which the machine is being moved independently of the other, there being in each machine body cotton picking mechanism adapted to pick cotton from the ground adjacent to cotton plants, said cotton picking mechanism including picking means proper, means for removing the cotton from the picking means, and means for transmitting the cotton to receptacles adapted to receive the same, and a depressor in front of and in close proximity to the picking means, said depressor being adapted to push the cotton upon, and to hold trash to, the ground while the picking means are removing cotton therefrom.

86. A cotton picking machine comprising a runing gear including a main axle; a machine body, said body being pivoted to said main axle and free at the rear end to follow the undulations of the ground over which the machine is being moved, cotton picking mechanism in said machine body and adapted to pick cotton from the ground adjacent to cotton plants, said picking mechanism including picking means proper, means for removing the cotton from the picking means, and means for transmitting the cotton to receptacles adapted to receive the same, and a depressor in front of and in close proximity to said picking means, said depressor being adapted to push the cotton upon, and to hold trash to, the ground while the picking means are removing cotton therefrom, said picking means being located at the rear end of said machine body.

87. A cotton picking machine comprising a running gear including a main axle; two machine bodies spaced a sufficient distance apart to permit cotton plants to pass bodily between them, the passage thus formed being unobstructed, each of said machine bodies being pivoted to said main axle and free at the rear end to follow the undulations of the ground over which the machine is being moved independently of the other, there being in each machine body cotton picking mechanism adapted to pick cotton from the ground adjacent to cotton plants, said cotton picking mechanism including picking means proper, means for removing the cotton from the picking means, and means for transmitting the cotton receptacles adapted to receive the same; and a depressor in front of and in close proximity to the picking means, said depressor being adapted to push the cotton upon, and to hold trash to, the ground while the picking means are removing the cotton therefrom, said picking means being located at the rear end of said machine body.

88. A cotton picking machine including a machine body, there being in said machine body cotton picking mechanism adapted to pick cotton from the ground over which the machine is being moved, said cotton picking mechanism including picking means proper, means for removing the cotton from the picking means, and means for transmitting the cotton to receptacles adapted to receive the same; a stripper in front of the picking means and adapted to dislodge cotton from the limbs and branches of cotton plants; and means located between the stripper and the picking means adapted to push cotton on the ground in the path of the picking means to enable the latter to pick the same.

89. A cotton picking machine including two machine bodies placed a sufficient distance apart to permit cotton plants to pass bodily between them the passage thus formed being unobstructed, there being in each machine body cotton picking mechanism adapted to pick cotton from the ground over which the machine is being moved, said cotton picking mechanism including picking means proper, means for removing the cotton from the picking means, and means for transmitting the cotton to receptacles adapted to receive the same; a stripper in front of the picking means and adapted to dislodge cotton from the limbs and branches of cotton plants; and means located between the stripper and the picking means adapted to push cotton on the ground in the path of the picking means to enable the latter to pick the same.

90. A cotton picking machine including a machine body, there being in said machine body cotton picking mechanism adapted to pick cotton from the ground over which the machine is being moved, said cotton picking mechanism including picking means proper, means for removing the cotton from the picking means, and means for transmitting the cotton to receptacles adapted to receive the same; a stripper in front of the picking means and adapted to dislodge cotton from the limbs and branches of cotton plants; and means located between the stripper and the picking means adapted to push the cotton on the ground in the path of the picking means to enable the latter to pick the same, said machine body being free at the picking end to follow the undulations of the ground.

91. A cotton picking machine comprising a running gear including a main axle; two machine bodies spaced a sufficient distance apart to permit cotton plants to pass bodily between them the passage thus formed being unobstructed, each of said machine bodies being pivoted to said main axle and free to follow the undulations of the ground over which the machine is being moved, there being in each machine body cotton picking mechanism adapted to pick cotton from the ground, said cotton picking mechanism including cotton picking means proper, means for removing the cotton from the picking means, and means for transmitting the cotton to receptacles adapted to receive the same; a stripper in front of the picking means and adapted to dislodge cotton from the limbs and branches of cotton plants; and means located between the stripper and the picking means adapted to push cotton on the ground in the path of the picking means to enable the latter to pick the same.

92. A cotton picking machine comprising a running gear including a main axle; a machine body, said machine body being pivoted to said main axle and free at the rear end to follow the undulations of the ground over which the machine is being moved; cotton picking mechanism in said machine body adapted to pick cotton from the ground, said cotton picking mechanism including picking means proper, means for removing the cotton from the picking means, and means for transmitting the cotton to receptacles adapted to receive the same; a stripper in front of the picking means and adapted to dislodge cotton from the limbs and branches of cotton plants; and means located between the stripper and the picking means to push the cotton on the ground in the path of the picking means to enable the latter to pick the same.

93. A cotton picking machine including two machine bodies spaced a sufficient distance apart to permit cotton plants to pass bodily between them the passage thus formed being unobstructed, each of said machine bodies being free at the rear end to follow the undulations of the ground over which the machine is being moved independently of the other, there being in each machine body cotton picking mechanism adapted to pick cotton from the ground, said cotton picking mechanism including picking means proper, means for removing the cotton from the picking means, and means for transmitting the cotton to receptacles adapted to receive the same; a stripper in front of the picking means and adapted to dislodge cotton from the limbs and branches of cotton plants, and means located between the stripper and the picking means adapted to push cotton on the ground in the path of the picking means to enable the latter to pick the same.

94. A cotton picking machine comprising a running gear including a main axle; a machine body, said machine body being pivoted to said main axle and free at the rear end to follow the undulations of the ground over which the machine is being moved; cotton picking mechanism in said machine body adapted to pick cotton from the ground, said cotton picking mechanism including picking means proper, means for removing the cotton from the picking means, and means for transmitting the cotton to receptacles adapted to receive the same; a stripper in front of the picking means and adapted to dislodge cotton from the limbs and branches of cotton plants, and means located between the stripper and the picking means adapted to push the cotton on the ground in the path of the picking means to enable the latter to pick the same, said cotton picking means being located at the rear end of the machine body.

95. A cotton picking machine comprising a running gear including a main axle; two machine bodies, spaced a sufficient distance apart to permit cotton plants to pass bodily between them the passage thus formed being unobstructed, said machine bodies being pivoted to said main axle and free at the rear end to follow the undulations of the ground over which the machine is being moved independently of the other, there being in each machine body cotton picking mechanism adapted to pick cotton from the ground, said cotton picking mechanism including picking means proper, means for removing the cotton from the picking means, and means for transmitting the cotton to receptacles adapted to receive the same; a stripper in front of the picking means and adapted to dislodge the cotton from the limbs and branches of cotton plants, and means located between the stripper and the picking means adapted to push cotton on the ground within the path of the picking means to enable the latter to pick the same, said picking means being located at the rear end of the machine body.

96. A cotton picking machine including a machine body, there being in said machine body cotton picking mechanism adapted to pick cotton from the ground over which the machine is being moved; a stripper in front of the picking mechanism and adapted to dislodge cotton from limbs and branches of cotton plants, and a scraper located between the stripper and the picking mechanism and moving close to the ground to push cotton on the ground in the path of the picking mechanism.

97. A cotton picking machine including two machine bodies spaced a sufficient distance apart to permit cotton plants to pass bodily between them the passage thus formed being unobstructed, there being in each machine body cotton picking mechanism, said picking mechanisms being adapted to pick cotton from the ground over which the machine is being moved; a stripper located in advance of the picking mechanisms and adapted to dislodge cotton from limbs and branches of cotton plants; and a scraper on each machine body and located between the stripper and the picking mechanisms and adapted to push cotton on the ground in the path of the picking mechanisms to enable the latter to pick the cotton, the scrapers being placed in the space between the two machine bodies.

98. A cotton picking machine comprising a running gear including a main axle; a machine body, said machine body being pivoted to said main axle and free to follow the undulations of the ground over which the machine is being moved; cotton picking mechanism in said machine body adapted to pick cotton from the ground; a stripper located in advance of the picking mechanism and adapted to dislodge cotton from limbs and branches of cotton plants, and a scraper located between the stripper and the picking mechanism and adapted to move close to the ground to push cotton on the ground in the path of the picking mechanism to enable the latter to pick the cotton.

99. A cotton picking machine comprising a running gear including a main axle; two machine bodies spaced a sufficient distance apart to permit cotton plants to pass bodily between them the passage thus formed being unobstructed, each of said machine bodies being pivoted to said main axle and free to follow the undulations of the ground over which the machine is being moved independently of the other, there being in each machine body cotton picking mechanism adapted to pick cotton from the ground; a stripper located in advance of the picking mechanisms and adapted to dislodge cotton from limbs and branches of cotton plants, and scrapers located between the stripper and the picking mechanisms and adapted to move close to the ground to push cotton on the ground in the path of the picking mechanisms to enable the latter to pick the cotton.

100. A cotton picking machine comprising a running gear including a main axle; a machine body, said machine body being pivoted to said main axle and free at the rear end to follow the undulations of the ground over which the machine is being moved; cotton picking mechanism in said machine body adapted to pick cotton from the ground; a stripper located in advance of the picking mechanism and adapted to dislodge cotton from limbs and branches of cotton plants, and a scraper located between the stripper and the picking mechanism and adapted to move close to the ground to push cotton on the ground in the path of the picking mechanism to enable the latter to pick the cotton.

101. A cotton picking machine comprising a running gear including a main axle; two machine bodies spaced a sufficient distance apart to permit cotton plants to pass bodily between them the passage thus formed being unobstructed, each of said machine bodies being pivoted to said main axle and free at the rear end to follow the undulations of the ground over which the machine is being moved independently of the other, there being in each machine body cotton picking mechanism adapted to pick cotton from the ground; a stripper located in advance of the picking mechanisms and adapted to dislodge cotton from limbs and branches of cotton plants, and scrapers located between the stripper and the picking mechanisms and adapted to move close to the ground to push cotton on the ground in the path of the picking mechanisms to enable the latter to pick the cotton.

102. A cotton picking machine comprising a running gear including a main axle; a machine body, said machine body being pivoted to said main axle and free at the rear end to follow the undulations of the ground over which the machine is being moved; cotton picking mechanism in said machine body adapted to pick cotton from the ground; a stripper located in advance of the picking mechanism and adapted to dislodge cotton from limbs and branches of cotton plants, and a scraper located between the stripper and the picking mechanism and adapted to move close to the ground to push cotton on the ground in the path of the picking mechanism to enable the latter to pick the cotton, the picking mechanism being located at the rear end of the machine body.

103. A cotton picking machine comprising a running gear including a main axle; two machine bodies spaced a sufficient distance apart to permit cotton plants to pass bodily between them the passage thus formed being unobstructed, each of said machine bodies being pivoted to said main axle and free at the rear end to follow the undulations of the ground over which the machine is being moved independently of the other, there being in each machine body cotton picking mechanism adapted to pick cotton from the ground; a stripper located in advance of the picking mechanisms and adapted to dislodge cotton from limbs and branches of cotton plants, and scrapers located between the stripper and the picking mechanisms and adapted to move close to the ground to push cotton on the ground in the path of the picking mechanisms to enable the latter to pick the cotton, said picking mechanisms being located at the rear end of the machine bodies.

104. A cotton picking machine including a machine body, there being in said machine body cotton picking mechanism adapted to pick cotton from the ground over which the machine is being moved; a stripper located in advance of the picking mechanism and adapted to dislodge cotton from limbs and branches of cotton plants, and a scraper located between the stripper and the picking mechanism and moving close to the ground to push cotton on the ground in the path of the picking mechanism, said scraper being pivoted and free to follow the undulations of the ground independently of the machine body.

105. A cotton picking machine including two machine bodies spaced a sufficient distance apart to permit cotton plants to pass bodily between them the passage thus formed being unobstructed, there being in each machine body cotton picking mechanism, said picking mechanism being adapted to pick cotton from the ground over which the machine is being moved; a stripper located in advance of the picking mechanisms and adapted to dislodge cotton from limbs and branches of cotton plants; and a scraper on each machine body and located between the stripper and the picking mechanisms and adapted to push cotton on the ground in the path of the picking mechanisms to enable the latter to pick the cotton, the scrapers being placed in the space between the two machine bodies, said scrapers being pivoted and free to follow the undulations of the ground independently of the machine bodies.

106. A cotton picking machine comprising a running gear including a main axle; a machine body, said machine body being pivoted to said main axle and free to follow the undulations of the ground over which the machine is being moved; cotton picking mechanism in said machine body adapted to pick cotton from the ground; a stripper located in advance of the picking mechanism and adapted to dislodge cotton from limbs and branches of cotton plants, and a scraper located between the stripper and the picking mechanism and adapted to move close to the ground to push cotton on the ground in the path of the picking mechanism to enable the latter to pick the cotton, said scraper being pivoted and free to follow the undulations of the ground independently of the machine body.

107. A cotton picking machine comprising a running gear including a main axle; two machine bodies spaced a sufficient distance apart to permit cotton plants to pass bodily between them the passage thus formed being unobstructed, each of said machine bodies being pivoted to said main axle and free to follow the undulations of the ground over which the machine is being moved independently of the other, there being in each machine body cotton picking mechanism adapted to pick cotton from the ground; a stripper located in advance of the picking mechanisms and adapted to dislodge cotton from limbs and branches of cotton plants, and scrapers located between the stripper and the picking mechanism and adapted to move close to the ground in the path of the picking mechanisms to enable the latter to pick the cotton, said scrapers being pivoted and free to follow the undulations of the ground independently of the machine bodies.

108. A cotton picking machine comprising a running gear including a main axle; a machine body, said machine body being pivoted to said main axle and free at the rear end to follow the undulations of the ground over which the machine is being moved; cotton picking mechanism in said machine body adapted to pick cotton from the ground; a stripper located in advance of the picking mechanism and adapted to dislodge cotton from limbs and branches of cotton plants, and a scraper located between the stripper and the picking mechanism and adapted to move close to the ground to push cotton on the ground in the path of the picking mechanism to enable the latter to pick the cotton, said scraper being pivoted and free to follow the undulations of the ground independently of the machine body.

109. A cotton picking machine comprising a running gear including a main axle, two machine bodies spaced a sufficient distance apart to permit cotton plants to pass bodily between them the passage thus formed being unobstructed, each of said machine bodies being pivoted to said main axle and free at the rear end to follow the undulations of the ground over which the machine is being moved independently of the other, there being in each machine body cotton picking mechanism adapted to pick cotton from the ground; a stripper located in advance of the picking mechanisms and adapted to dislodge cotton from limbs and branches of cotton plants, and scrapers located between the stripper and the picking mechanisms and adapted to move close to the ground to push cotton on the ground in the path of the picking mechanism to enable the latter to pick the cotton, said scrapers being pivoted and free to follow the undulations of the ground independently of the machine bodies.

110. A cotton picking machine comprising a running gear including a main axle; a machine body, said machine body being pivoted to said main axle and free at the rear end to follow the undulations of the ground over which the machine is being moved; cotton picking mechanism in said machine body adapted to pick cotton from the ground; a stripper located in advance of the picking mechanism and adapted to dislodge cotton from limbs and branches of cotton plants, and a scraper located between the stripper and the picking mechanism and adapted to move close to the ground to push cotton on the ground in the path of the picking mechanism to enable the latter to pick the cotton, the picking mechanism being located at the rear end of the machine, said scraper being pivoted and free to follow the undulations of the ground independently of the machine body.

111. A cotton picking machine comprising a running gear including a main axle; two machine bodies spaced a sufficient distance apart to permit cotton plants to pass bodily between them the passage thus formed being unobstructed, each of said machine bodies being pivoted to said main axle and free at the rear end to follow the undulations of the ground over which the machine is being moved independently of the other, there being in each machine body cotton picking mechanism adapted to pick cotton from the ground; a stripper located in advance of the picking mechanism and adapted to dislodge cotton from limbs and branches of cotton plants, and scrapers located between the stripper and the picking mechanisms and adapted to move close to the ground to push cotton on the ground in the path of the picking mechanisms to enable the latter to pick the cotton, said picking mechanisms being located at the rear end of the machine bodies, said scrapers being pivoted and free to follow the undulations of the ground independently of the machine bodies.

In testimony that I claim the foregoing as my invention, I have hereunto set my hand in the presence of two subscribing witnesses.

ORLEY C. HOUGHTON.

Witnesses:
MICHAEL J. STARK,
A. G. PETERSON.